(12) United States Patent
Yong

(10) Patent No.: US 11,951,400 B2
(45) Date of Patent: Apr. 9, 2024

(54) SECURE DECENTRALIZED VIDEO GAME TRANSACTION PLATFORM

(71) Applicant: Sony Interactive Entertainment LLC, San Mateo, CA (US)

(72) Inventor: Stephen Yong, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 917 days.

(21) Appl. No.: 15/921,471

(22) Filed: Mar. 14, 2018

(65) Prior Publication Data

US 2019/0282906 A1    Sep. 19, 2019

(51) Int. Cl.
*A63F 13/79* (2014.01)
*A63F 13/25* (2014.01)
(Continued)

(52) U.S. Cl.
CPC .............. *A63F 13/79* (2014.09); *A63F 13/25* (2014.09); *G06Q 20/0658* (2013.01);
(Continued)

(58) Field of Classification Search
CPC ..... A63F 13/79; A63F 13/25; G06Q 20/0658; G06Q 20/123; G06Q 20/3829; G06Q 2220/00
(Continued)

(56) References Cited

U.S. PATENT DOCUMENTS 10,946,283 B1    3/2021    Meilich et al.
11,392,947 B1    7/2022    Prasad et al.
(Continued)

FOREIGN PATENT DOCUMENTS

CN    107563761 A    1/2018
CN    110270097 A    9/2019
(Continued)

OTHER PUBLICATIONS

Andreas M. Antonopoulos, Mastering Bitcoin, Dec. 2014, 1st Edition (Year: 2014).*
(Continued)

*Primary Examiner* — Patrick McAtee
*Assistant Examiner* — Zesheng Xiao
(74) *Attorney, Agent, or Firm* — Polsinelli LLP

(57) ABSTRACT

Multiple video game consoles each store a blockchain ledger with multiple blocks, which is either associated with a particular video game or with a the particular type of video game console that the video game consoles are each characterized by. One of the consoles receives a message identifying an intended transaction corresponding to transfer of an identified quantity of an in-game virtual asset from a transferor account to a transferee account. The console verifies that the intended transaction is valid and generates a new block that includes the transaction, optionally one or more additional verified intended transactions, and a block header that includes a hash of a most recent block in the blockchain ledger. The console appends the new block to the blockchain ledger and transmits it to the other consoles, which each also append the new block to their copy of the blockchain ledger, thereby completing the transaction.

20 Claims, 15 Drawing Sheets

(51) Int. Cl.
*G06Q 20/06* (2012.01)
*G06Q 20/12* (2012.01)
*G06Q 20/38* (2012.01)

(52) U.S. Cl.
CPC ....... *G06Q 20/123* (2013.01); *G06Q 20/3829* (2013.01); *G06Q 2220/00* (2013.01)

(58) Field of Classification Search
USPC .......................................................... 705/75
See application file for complete search history.

(56) References Cited

U.S. PATENT DOCUMENTS

| | | | |
|---|---|---|---|
| 11,663,551 | B2 | 5/2023 | Stephens et al. |
| 11,741,426 | B2 | 8/2023 | Stephens et al. |
| 2012/0231867 | A1 | 9/2012 | Dimitriadis et al. |
| 2014/0108263 | A1 | 4/2014 | Ortiz et al. |
| 2015/0371295 | A1* | 12/2015 | Gill ........................ A63F 13/30 463/25 |
| 2017/0005804 | A1 | 1/2017 | Zinder |
| 2017/0103391 | A1 | 4/2017 | Wilson et al. |
| 2017/0232300 | A1* | 8/2017 | Tran ........................ H04L 67/12 434/247 |
| 2017/0344987 | A1 | 11/2017 | Davis |
| 2017/0346693 | A1 | 11/2017 | Dix et al. |
| 2018/0013567 | A1 | 1/2018 | Davis |
| 2018/0144292 | A1* | 5/2018 | Mattingly ............. G06F 16/903 |
| 2018/0189528 | A1* | 7/2018 | Hanis ................. G06Q 30/0185 |
| 2018/0197172 | A1* | 7/2018 | Coburn ................. H04L 9/0637 |
| 2019/0232172 | A1* | 8/2019 | Malan ................... H04L 9/3239 |
| 2019/0299105 | A1 | 10/2019 | Knight et al. |
| 2020/0184041 | A1 | 6/2020 | Andon et al. |
| 2020/0192957 | A1 | 6/2020 | Augustine et al. |
| 2022/0355208 | A1 | 11/2022 | Stephens |
| 2022/0358450 | A1 | 11/2022 | Stephens |

FOREIGN PATENT DOCUMENTS

| | | |
|---|---|---|
| CN | 111544890 A | 8/2020 |
| EP | 3765981 | 1/2021 |
| JP | 2005-293591 A | 10/2005 |
| JP | 2007-510991 A | 4/2007 |
| JP | 2017-515252 | 6/2017 |
| JP | 2021-518592 | 8/2021 |
| WO | WO 2019/177713 | 9/2019 |
| WO | WO 2022/235403 | 11/2022 |

OTHER PUBLICATIONS

PCT Application No. PCT/US2019/016799 International Search Report and Written Opinion dated May 6, 2019.
PCT Application No. PCT/US2019/016799 International Preliminary Report on Patentability dated Sep. 15, 2020.
Ledger, "Blockchain and Games: A Match Made in Heaven?" Sep. 22, 2020, Retrieved on Jun. 24, 2022.
PCT Application No. PCT/US2022/024670 International Search Report and Written Opinion dated Jul. 20, 2022.
U.S. Appl. No. 17/315,005 Office Action dated Sep. 9, 2022.
U.S. Appl. No. 17/315,127 Office Action dated Sep. 14, 2022.
JP Application No. 2020-548956 Non-Final Notification of Reasons for Refusal dated Apr. 27, 2023.
Chinese Application No. 201910110399.1 Frist Office Action dated May 23, 2023.
Dapps_market, "What is CryptoKitties? Guidance to start and play the game!", [online] OESIR, Mar. 12, 2018, Internet: <URL:https://dappsmarket.net/cryptokitties/cryptokitties-howtoplay/>, [retrieved on: Mar. 1, 2023].
Takeshi Kubo, "Basic blockchain course for engineers", [online], Japan Network Information Center, Dec. 27, 2017, pp. 1-63, Internet: <URL:https://www.nic.ad.jp/ja/materials/iw/2017/proceedings/s02/s2-kubo.pdf>, [retrieved on: Mar. 1, 2023].
Nagata03, "Structure of blocks", [online] Qiita Inc., Dec. 2, 2017, Internet: <URL:https://qiita.com/nagata03/items/4ec24c387d037cf155df>, [retrieved on: Mar. 1, 2023].
Chinese Application No. 202010166870.1 First Office Action dated Dec. 26, 2022.
Chinese Application No. 202010166870.1 Search Report dated Dec. 26, 2022.
European Application No. 19767701.6 Extended European Search Report dated Nov. 30, 2021.
PCT Application No. PCT/US2022/024670 International Preliminary Report on Patentability dated Nov. 16, 2023, pages.
SIENA-17040EP European Application No. 19767701.6 Exam Report dated Oct. 9, 2023, 8 pages.
SIENA-17040JP Japanese Application No. 2020-548956 Office Action dated Nov. 9, 2023, 22 pages.

* cited by examiner

SECURE DECENTRALIZED VIDEO GAME TRANSACTION PLATFORM

BACKGROUND

Technical Field

Aspects of the subject technology relate to blockchain-based video game management, and in particular, to a distributed blockchain-based platform for automatically and securely managing and tracking transactions of in-game assets, currencies, entitlements, and other video game data.

Description of the Related Art

A video game is an electronic game in which a player interacts with a user interface coupled to a computing device, causing the computing device to generate visual feedback via a visual output device such as a television screen or computer monitor. Typical user interfaces for video games include arcade joysticks, video game console controllers, computer keyboards, computer mice, and touch-sensitive surfaces.

Some video games feature competitive or cooperative multi-player gameplay, meaning that multiple players play the same video game simultaneously, usually with each player having their own user interface. During "local" multiplayer, different user interfaces for different players all connect to a single computing device. During local area network (LAN) multiplayer or online multiplayer, different players each user different computing devices that then interact via a LAN or over the internet.

A player playing a video game can often progress through the game, for example by exploring an environment or accomplishing various goals. The player can then save their game to an account corresponding to the player so that their progress is not lost when the player returns to play again. In some video games, players can acquire virtual in-game assets, which are then saved to the player's account. For example, a player might unlock a particular weapon, outfit, environment, or vehicle during gameplay. Some games also allow players to acquire virtual in-game currencies during gameplay, which the player can then trade for in-game assets during gameplay.

Traditionally, transfer of in-game assets and in-game currencies from one player to another has been impossible. Recently, a handful of video games with online multiplayer functionality have begun to allow limited transfer of in-game assets, typically using centralized servers associated with the individual game as intermediaries to ensure that transactions are valid and fair. There are substantial issues with these transfer methodologies, however. Centralized servers represent a single point of failure that affects reliability and security and is subject to race conditions and performance issues. A centralized server crashing or coming offline at the wrong time, or a network bandwidth shortage at the wrong time, may mean that a transfer fails or a in-game asset is lost mid-transfer. Similarly, a centralized server that is compromised by a hacker or malicious party could defraud users and become a vector for thefts and cyberattacks. Managing authenticity and ownership of virtual in-game assets can be a challenge as well, and different centralized servers might not store the same records or might have records that do not match. Data storage concerns with centralized servers and can also lead to records of past transactions being lost either intentionally to clear up space over time or accidentally due to data corruption or server failure. Poor recordkeeping exacerbates fraudulent activity issues. Recent news reports indicate that cybercriminals have been caught laundering money through in-game asset transactions, making security and good recordkeeping increasingly important.

Cryptocurrencies such as bitcoin are based on recently-developed blockchain ledger technologies that maintain a distributed ledger of all transactions and offer improved security between parties. So far, blockchain ledger technologies have largely remained in the world of finance.

Accordingly, a more secure, reliable, and distributed technology for transfer of in-game assets, in-game currencies, and other video game data is needed.

DETAILED DESCRIPTION

Multiple video game consoles each store a blockchain ledger with multiple blocks, which is either associated with a particular video game or with a the particular type of video game console that the video game consoles are each characterized by. One of the consoles receives a message identifying an intended transaction corresponding to transfer of an identified quantity of an in-game virtual asset from a transferor account to a transferee account. The console verifies that the intended transaction is valid and generates a new block that includes the transaction, optionally one or more additional verified intended transactions, and a block header that includes a hash of a header of a most recent block in the blockchain ledger (or alternately/additionally a hash of the entire most recent block). The console appends the new block to the blockchain ledger and transmits it to the other consoles, which each also append the new block to their copy of the blockchain ledger, thereby completing the transaction.

Figure 1A:
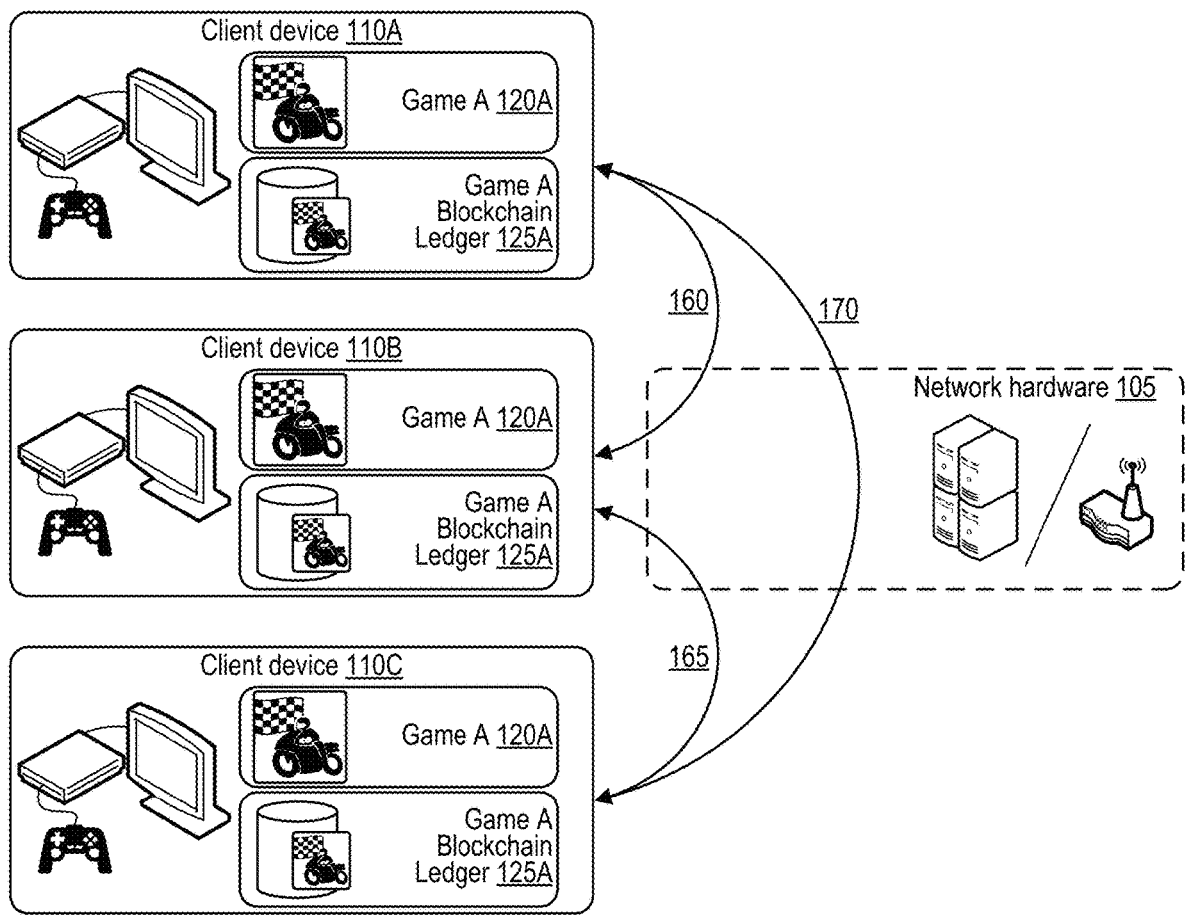
FIG. 1A illustrates a network environment through which a distributed blockchain ledger is kept on a per-game basis.

FIG. 1A illustrates a network environment through which a distributed blockchain ledger is kept on a per-game basis.

The network environment of FIG. 1A includes three client devices 110—specifically, a first client device 110A, a second client device 110B, and a third client device 110C. Each of the three client devices 110 of FIG. 1A store a video game A 120A and a video-game-A-specific blockchain ledger 125A.

Each of the three client devices 110 of FIG. 1A is a particular type of video game console that is compatible with video game A 120A and optionally a number of other video games. The particular type of video game console include one or more computing devices 800 as illustrated in or discussed with respect to FIG. 8, or may include at least a subset of the components of one or more computing devices 800.

The network environment of FIG. 1A optionally includes network hardware 105, which may include one or more routers, servers, gateways, network bridges, modems, wireless access points, networking cables, line drivers, switches, hubs, repeaters, or combinations thereof.

The first client device 110A and second client device 110B can communicate via communication path 160. The second client device 110B and third client device 110C can communicate via communication path 165. The first client device 110A and third client device 110C can communicate via communication path 170. Each of the communication paths 160, 165, and 170 may be direct communications from one client device 110 to another client device 110 or may optionally pass through the network hardware 105. Each of the communication paths 160, 165, and 170 may pass through the public Internet, be confined to a local area network (LAN) that is wireless or wired or some combination thereof, or be confined to a personal area network (PAN) that is wireless or wired or some combination thereof.

A blockchain ledger comprises a digital ledger shared across public or private peer-to-peer networks. These digital ledgers are tamper proof and record transactions where a transferor sends a virtual asset to a transferee. The ledgers, which are distributed to all the nodes in the network, permanently store a validated history of transactions that take place across all of the peers in the network via a process illustrated in and discussed with respect to FIG. 4.

Figure 3:
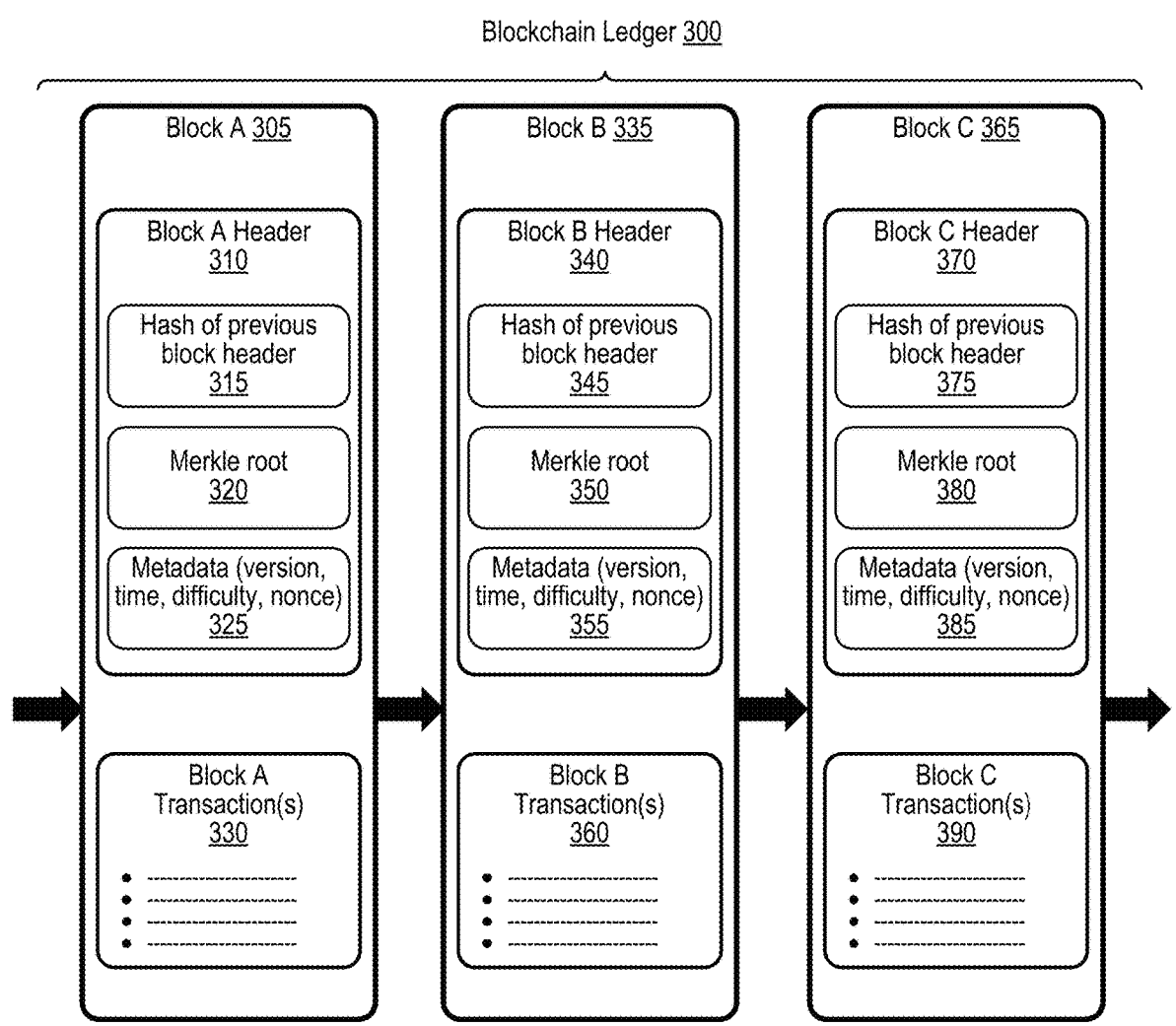
FIG. 3 illustrates a portion of a blockchain ledger that implements distributed in-game transfer functionality.

The blockchain ledger includes multiple blocks that each identify one or more transactions and also reference the previous block in the blockchain, for example by including a hash of the header of the previous block in the blockchain in a header of each block as illustrated in and described with respect to FIG. 3. Including the hash of the header of the previous block secures the blockchain ledger by preventing modification of any block of the blockchain after the block has been entered into the blockchain, as any change to a particular block would cause that block's hash in the next block to be incorrect. Further, modification of that block's hash in the next block would make the next block's hash in the block after the next block incorrect, and so forth.

Figure 5:
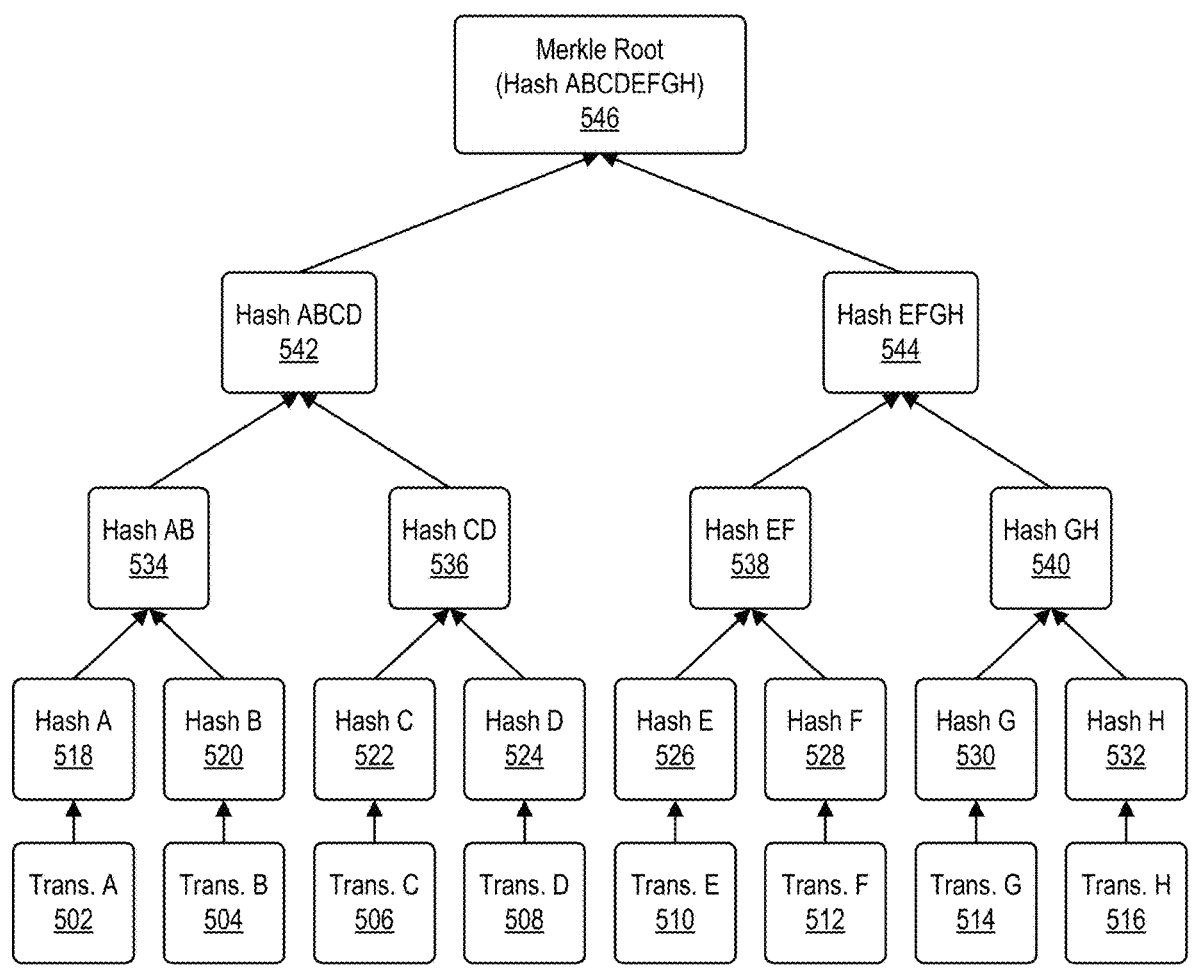
FIG. 5 is a diagram of a Merkle tree for securing an in-game transfer transaction using the blockchain ledger.

A Merkle root of the one or more transactions of the block may be generated using the same or a different hash algorithm as illustrated in and discussed with respect to FIG. 5, to prevent modification of the transactions in a new block.

The hashes of previous block and the Merkle root hashes are generated using a hash algorithm, which may optionally be a secure hash algorithm (SHA), such as SHA-0, SHA-1, SHA-2, SHA-3, SHA-N, SHA-128, SHA-192, SHA-256, SHA-512, SHA-224, SHA-384, SHA-512/224, SHA-512/256, SHA3-224, SHA3-256, SHA3-384, SHA3-512, SHAKE128, or one or more variants or combinations thereof.

The game-specific blockchain ledger 125A of FIG. 1A is specific to the video game A 120A. That is, the game-specific blockchain ledger 125A of FIG. 1A stores transactions of in-game virtual assets involving the video game A 120A. In-game virtual assets involving the video game A 120A may be defined as virtual assets that are earned during gameplay of the video game A 120A, acquired in exchange for an in-game virtual currency within the video game A 120A, purchased or otherwise acquired via in-app purchase (IAP) or downloadable content (DLC) through the video game A 120A, usable to modify gameplay of the video game A 120A, or a combination thereof. The game-specific blockchain 125A may be limited to only identifying/listing/tracking transactions of in-game virtual assets involving the video game A 120A, or may in some cases identify/list/track other types of transactions, such as purchases or transfers of copies of the video game A 120A itself, transactions involving purchase or use of gift cards or other virtual currencies tied to a video game platform rather than the individual video game A 120A, transactions of in-game virtual assets involving games related to the video game A 120A such as sequels or prequels, or a combination thereof.

The game-specific blockchain ledger 125A of FIG. 1A may in some cases be stored and/or maintained only by client devices 110/user accounts that store/possess a copy of the video game A 120A, client devices 110/user accounts that are authorized to access a copy of the video game A 120A, client devices 110/user accounts that are authorized to run a copy of the video game A 120A, client devices 110/user accounts that have run a copy of the video game A 120A at least a predetermined number of times (e.g., at least once), or a combination thereof.

Figure 4:
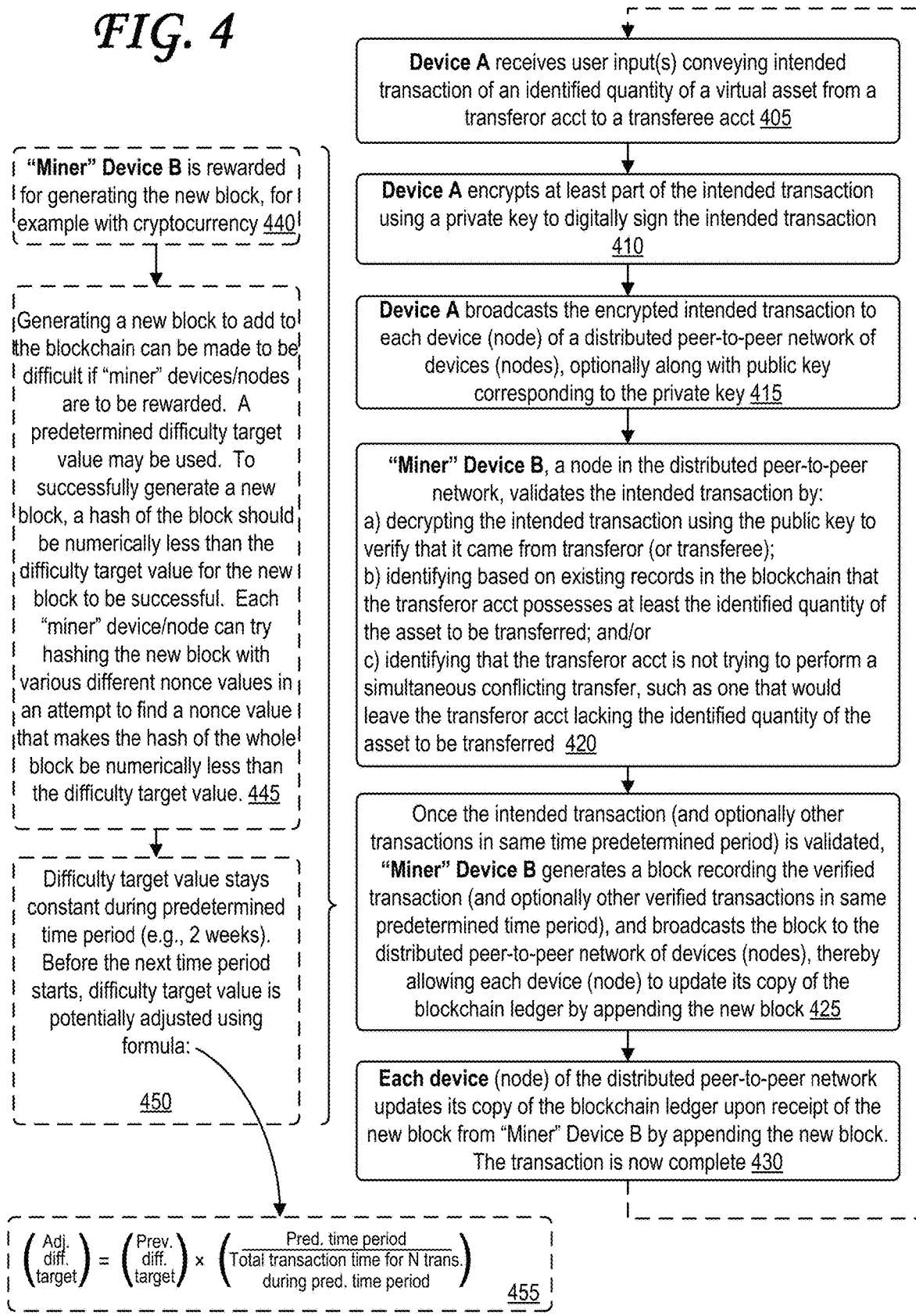
FIG. 4 is a flow diagram illustrating operations for realizing an in-game transfer transaction and adding the transaction to the blockchain ledger.

In such cases, a "miner" client device 110 such as the one discussed with respect to steps 420 and 425 of FIG. 4 may verify that the transaction is valid in part by verifying that the transferor account stores/possesses a copy of the video game A 120A, is authorized to access a copy of the video game A 120A, is authorized to run a copy of the video game A 120A, has run a copy of the video game A 120A at least a predetermined number of times, or a combination thereof. Such a "miner" client device 110 may verify that the transaction is valid in part by verifying that the transferee account stores/possesses a copy of the video game A 120A, is authorized to access a copy of the video game A 120A, is authorized to run a copy of the video game A 120A, has run a copy of the video game A 120A at least a predetermined number of times, or a combination thereof. Finally, such a "miner" client device 110, in some cases, is only allowed to participate in verifying the transaction if the "miner" client device 110 and/or a user account associated with the "miner" client device 110 stores/possesses a copy of the video game A 120A, is authorized to access a copy of the video game A 120A, is authorized to run a copy of the video game A 120A, has run a copy of the video game A 120A at least a predetermined number of times, or a combination thereof.

Figure 1B:
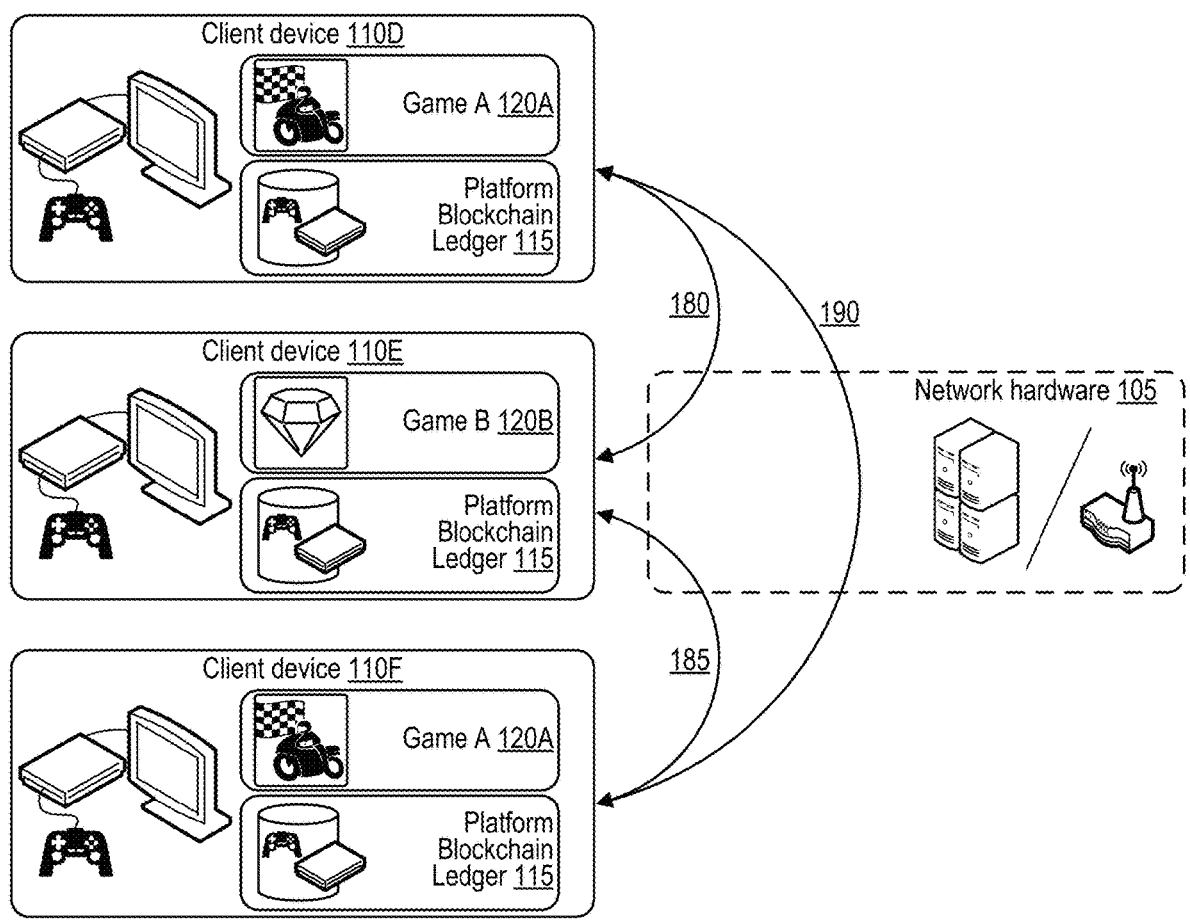
FIG. 1B illustrates a network environment through which a distributed blockchain ledger is kept on a platform-wide basis.
Figure 1C:
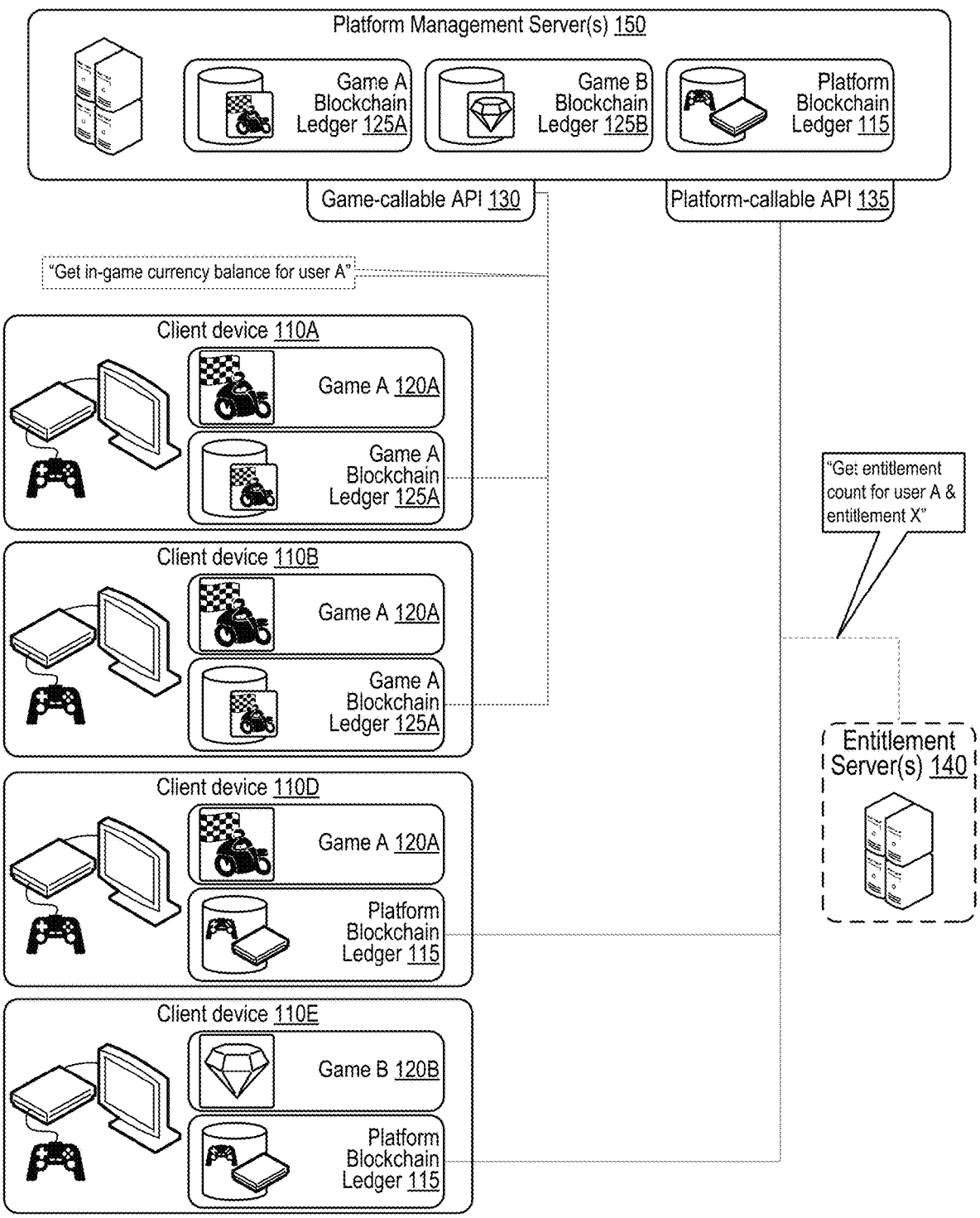
FIG. 1C illustrates a network environment through which different types of distributed blockchain ledgers are kept and managed via a platform management server.

Different game-specific blockchain ledgers 125 may be generated to correspond to different games as visible with the game-specific blockchain ledgers 125B that corresponds to the Video Game B 120B of FIG. 1C. Each game-specific blockchain ledger 125 may be a ledger for any type of transaction identified in FIGS. 2A-2F, or may alternately be limited to a subset of those types of transactions.

FIG. 1B illustrates a network environment through which a distributed blockchain ledger is kept on a platform-wide basis.

The platform-specific blockchain ledger 115 of FIG. 1B is similar to the game-specific blockchain ledger 12 of FIG. 1A, but it may identify transactions associated with multiple games that run on a particular video game platform. For instance, in FIG. 1B, client devices 110D and 110F stores Video Game A 120A, but client device 110E instead stores Video Game B 120B. Despite this, client devices 110D, 110E, and 110F all store the platform blockchain 115 because Video Game A 120A and Video Game B 120B are both compatible with the same video game platform, which encompasses client devices 110D, 110E, and 110F. A video game platform as discussed herein may include multiple instances of a particular type of video game console, optionally along with associated network hardware 105.

For example, a platform-specific blockchain ledger 115 may be stored on and managed by multiple Playstation® 4 console systems, which in the context of FIG. 1B, would be client devices 110. The platform-specific blockchain ledger 115 may optionally be stored on and managed by servers (which may also be client devices 100 in the context of FIG. 1B) and other network hardware 105 running a network service associated with Playstation® 4 console systems, such as the Playstation® Plus online network service for Playstation® 4. Other types of client devices 100, such as older Playstation® 3 console systems or portable Playstation® Vita portable console systems, might be specifically excluded from participation in the platform-specific blockchain ledger 115 of FIG. 1B, and might instead store and manage their own separate respective platform-specific blockchain ledgers 115. A platform-specific blockchain ledger 115 may additionally encompass and/or be limited to certain client devices 100 of certain brand(s) or manufacturer(s), such as Sony® client devices 100, Playstation® home and/or portable consoles that support blockchain ledger functionality, client devices 100 that support the Playstation® Plus online network service, or a combination thereof. A platform-specific blockchain ledger 115 may additionally encompass and/or be limited to certain client devices 100 based on location or purchase method, such as client devices 100 sold at a particular store type, client devices 100 sold at a particular store location, client devices 100 purchased online generally, client devices 100 purchased online through a specific website, client devices 100 located in a particular region, client devices 100 purchased/sold in a particular region, or a combination thereof. Regions may be defined by country, city, county, state, continent, electoral district, other pre-defined borders, or a combination thereof.

A platform-specific blockchain ledger 115 may explicitly exclude certain types of client devices 100. For example, a platform-specific blockchain ledger 115 may exclude a category of devices, such as portable video game console devices or home video game console devices. A platform-specific blockchain ledger 115 may additionally exclude client devices 100 of certain brand(s) or manufacturer(s), such as Nintendo® or Microsoft® video game console client devices 100, client devices 100 that are too old to support blockchain ledger functionality or otherwise do not support blockchain ledger functionality, client devices 100 that do not have access to or do not support access to a particular online network service such as the Playstation® Plus online network service, or a combination thereof. A platform-specific blockchain ledger 115 may additionally exclude certain client devices 100 based on location or purchase method, such as client devices 100 sold at a particular store type, client devices 100 sold at a particular store location, client devices 100 purchased online generally, client devices 100 purchased online through a specific website, client devices 100 located in a particular region, client devices 100 purchased/sold in a particular region, or a combination thereof. Regions may be defined by country, city, county, state, continent, electoral district, other pre-defined borders, or a combination thereof.

It should be noted that the paragraphs above identifying which client devices 100 may be included in or excluded from participation in or storage of the blockchain ledger 115 may also apply to game-specific blockchain ledgers 125. Participation in this context may concern participation as a transferor, participation as a transferee, participation as a miner/verifier, participation as a client device 100 that simply stores at least a portion of the blockchain ledger 125/115, or a combination thereof.

In such cases, a "miner" client device 110 such as the one discussed with respect to steps 420 and 425 of FIG. 4 may verify that the transaction is valid in part by verifying that the transferor account and/or a client device 100 associated with the transferor account is permitted to use/access the platform as discussed above, by verifying that the transferee account and/or a client device 100 associated with the transferee account is permitted to use/access the platform as discussed above, by verifying that the "miner" client device 110 and/or a user account associated with the "miner" client device 110 is permitted to use/access the platform as discussed above, or a combination thereof.

Platform-specific blockchain ledgers 115 may store/manage the same types of transactions as discussed with respect to game-specific blockchain ledgers 125. Platform-specific blockchain ledgers 115 may in some cases, however, be limited to transactions of virtual assets other than in-game assets specific to games that already have game-specific blockchain ledgers 125. For example, if client device 100 detects that Video Game A 120A uses a corresponding game-specific blockchain ledger 125A, it may store and manage transactions for Video Game A 120A using the game-specific blockchain ledger 125A instead of using the platform-specific blockchain ledger 115. If client device 100 detects that Video Game C 120C does not have a corresponding game-specific blockchain ledger 125C, it may store and manage transactions for Video Game C 120C using the platform-specific blockchain ledger 115. Platform-specific blockchain ledger 115 may also be used to virtual asset transactions for virtual assets that don't concern any specific video game but instead concern the video game platform, such as purchase or transfer of a video game, purchase or transfer of a service such as online multiplayer, purchase or transfer of media such as music or movies to play via the client device 100, purchase or transfer of a gift card or credits acquired through the platform rather than through any individual game, or combinations thereof.

FIG. 1C illustrates a network environment through which different types of distributed blockchain ledgers are kept and managed via a platform management server.

The network environment of FIG. 1C includes client devices 110A and 110B of FIG. 1A as well as client devices 110D and 110E of FIG. 1B. The network environment of FIG. 1C also includes one or more platform management servers 150 and one or more entitlement servers 140. References further herein to a single platform management server 150 or a single entitlement server 140 should be understood to alternately refer to multiple single platform management servers 150 or multiple entitlement servers 140, respectively. Some servers may optionally serve as both platform management server(s) 150 and entitlement server(s) 140.

Each platform management server 150 includes one or more blockchain ledgers, including game-specific blockchain ledgers 125 and/or platform-specific blockchain ledgers 115. For example, the platform management server(s) 150 of FIG. 1C stores a game-specific blockchain ledger 125A corresponding to video game A 120A, a game-specific blockchain ledger 125B corresponding to video game B 120B, and a platform-specific blockchain ledger 115. These ledgers function as illustrated and described with respect to FIG. 1A and FIG. 1B, respectively.

The platform management server 150 of FIG. 1C also includes application programming interfaces (APIs) 130/135 corresponding to the blockchain ledgers 115/125.

Specifically, a game-callable blockchain ledger API 130 can be called by an operating system, video game, or other software running on client devices 110A and 110B to implement functionality of a game-centric blockchain ledger 125, such as game-centric blockchain ledgers 125A and 125B of FIG. 1C. The game-callable API 130 allows game-centric blockchain ledgers 125 to operate in a standardized way between different client devices 110, and allows updates to be instantaneous. It also provides a degree of control and centralization for a party, such as a manufacturer or developer of the client devices 110, to adjust and control certain aspects of each game-centric blockchain ledger 125. Such control and centralization would typically otherwise be forfeited due to the decentralization that is the focus of blockchain technologies.

Similarly, a platform-callable blockchain ledger API 135 can be called by an operating system, video game, or other software running on client devices 110D and 110E to implement functionality of a platform-centric blockchain ledger 115 of FIG. 1C. The platform-callable API 115 allows one or more platform-centric blockchain ledgers 115 to operate in a standardized way between different client devices 110, and allows updates to be instantaneous. It also provides a degree of control and centralization for a party, such as a manufacturer or developer of the client devices 110, to adjust and control certain aspects of each platform-centric blockchain ledger 115. Such control and centralization would typically otherwise be forfeited due to the decentralization that is the focus of blockchain technologies.

An entitlement server 140 may be a server associated with a developer, publisher, manufacturer, social media influencer, or other entity associated with the client devices 110 or with particular video games 120. An entitlement server 140 may be associated with certain "entitlements," such as discounts, coupons, promotions, multiplayer game tournament awards, rewards for certain game achievements, or combinations thereof. "Entitlements" can alternately or additionally define ownership or rental of digital content like subscriptions, games, gift cards/tokens, movies, and TV shows. When a user purchases, rents, receives as a gift, or otherwise acquires an item, a game, a gift card/token, a video, or a subscription to a service or to any of the above, that user can gain an entitlement. These entitlements may likewise be transferred via blockchain ledgers. In FIG. 1C, an entitlement server 140 is illustrated as calling the platform-callable API 135 to use the platform-specific blockchain ledger 115, but it can optionally call the game-callable API 130 to use a game-specific blockchain ledger 130 instead or additionally.

For example, a game publisher may acquire one hundred 10% discount coupons in exchange for publishing a particular video game 120 via the platform to be played by client devices 110 of a specific type, optionally via platform management server(s) 150. These one hundred 10% discount coupons might be tied to one or more user accounts associated with the publisher and/or to the specific hardware of one or more entitlement server(s) 140 associated with the publisher. The publisher might give out 40 of its coupons to user accounts/client device 100 associated with players that win tournaments. The publisher might give out 30 of its coupons to user accounts/client device 100/entitlement servers 140 associated with social media influencers, such as celebrity gamers or gaming news publications, to use and/or to distribute further as they choose. The publisher might give out 20 of its coupons to user accounts/client device 100 associated with players selected at random, optionally limited based on geographic region. The publisher might give out 20 of its coupons to user accounts/client device 100 associated with players that reach certain achievements in a video game 120, such as being the first player to pass a certain level or achieving a high score or fastest completion time.

In some cases, an entitlement server 140 and/or platform management server 150, or one or more accounts associated with such servers, may include an unlimited amount of one or more entitlements or other virtual assets. This may be useful for a company that owns the platform to be able to grant entitlements to publishers, social media influencers, players, and the like. This may also be useful where blockchain ledgers are used to keep track of certain virtual assets gained or lost by a player due to actions other than transfer of the virtual asset between players.

Figure 2A:
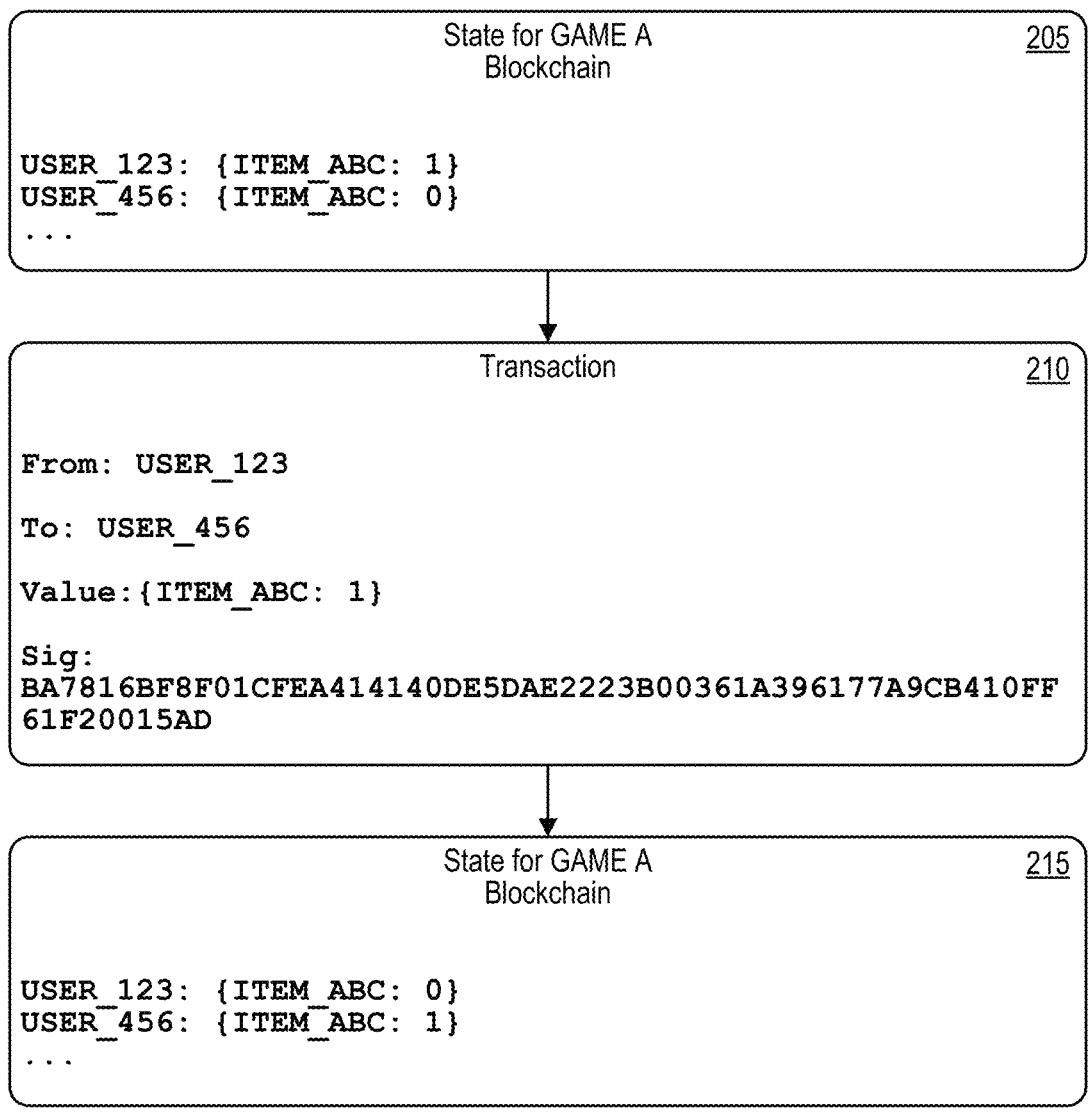
FIG. 2A illustrates a blockchain transaction that conveys transfer of an in-game asset from one player account to another player account.
Figure 2B:
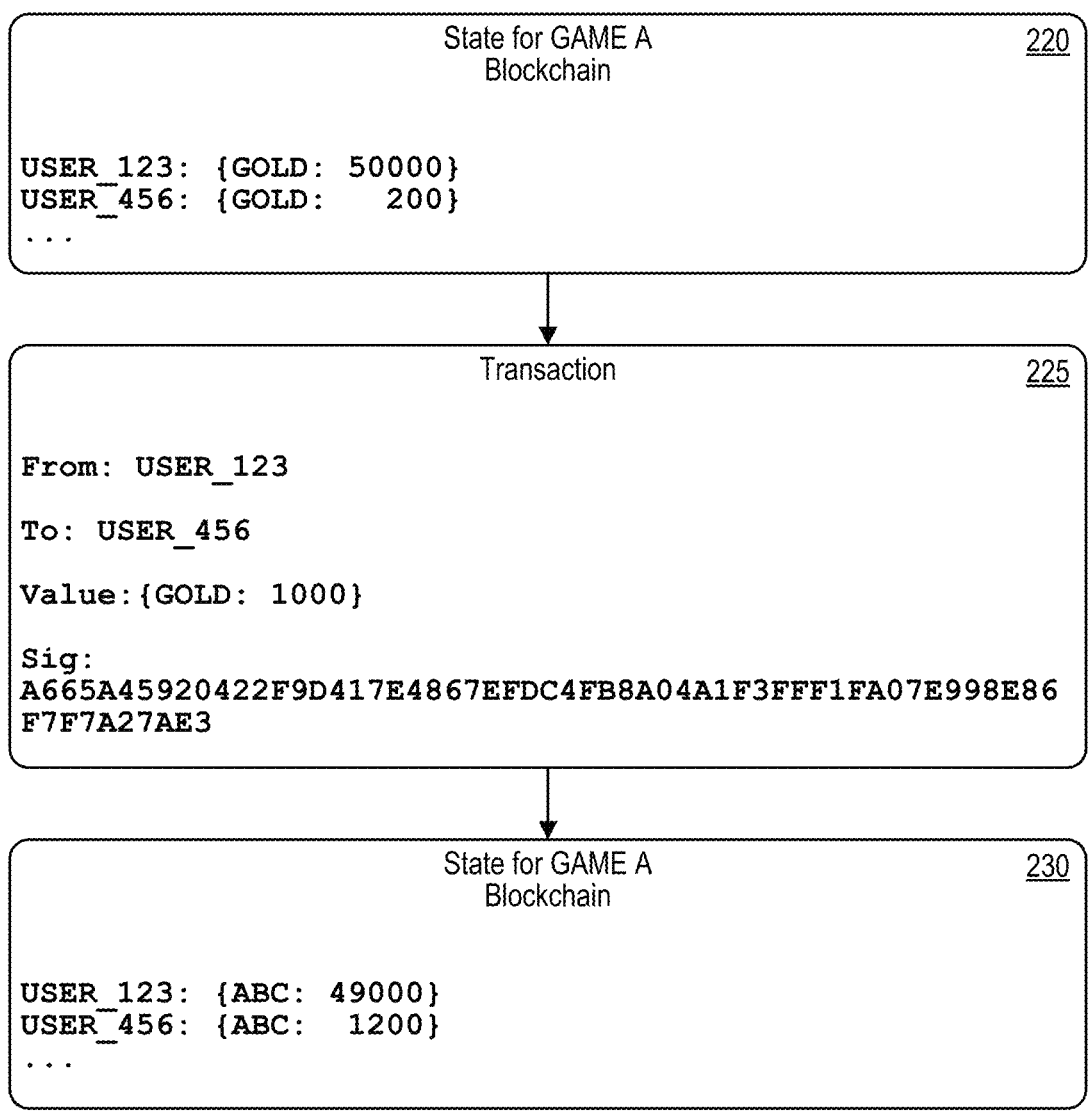
FIG. 2B illustrates a blockchain transaction that conveys transfer of an amount of in-game currency from one player account to another player account.
Figure 2C:
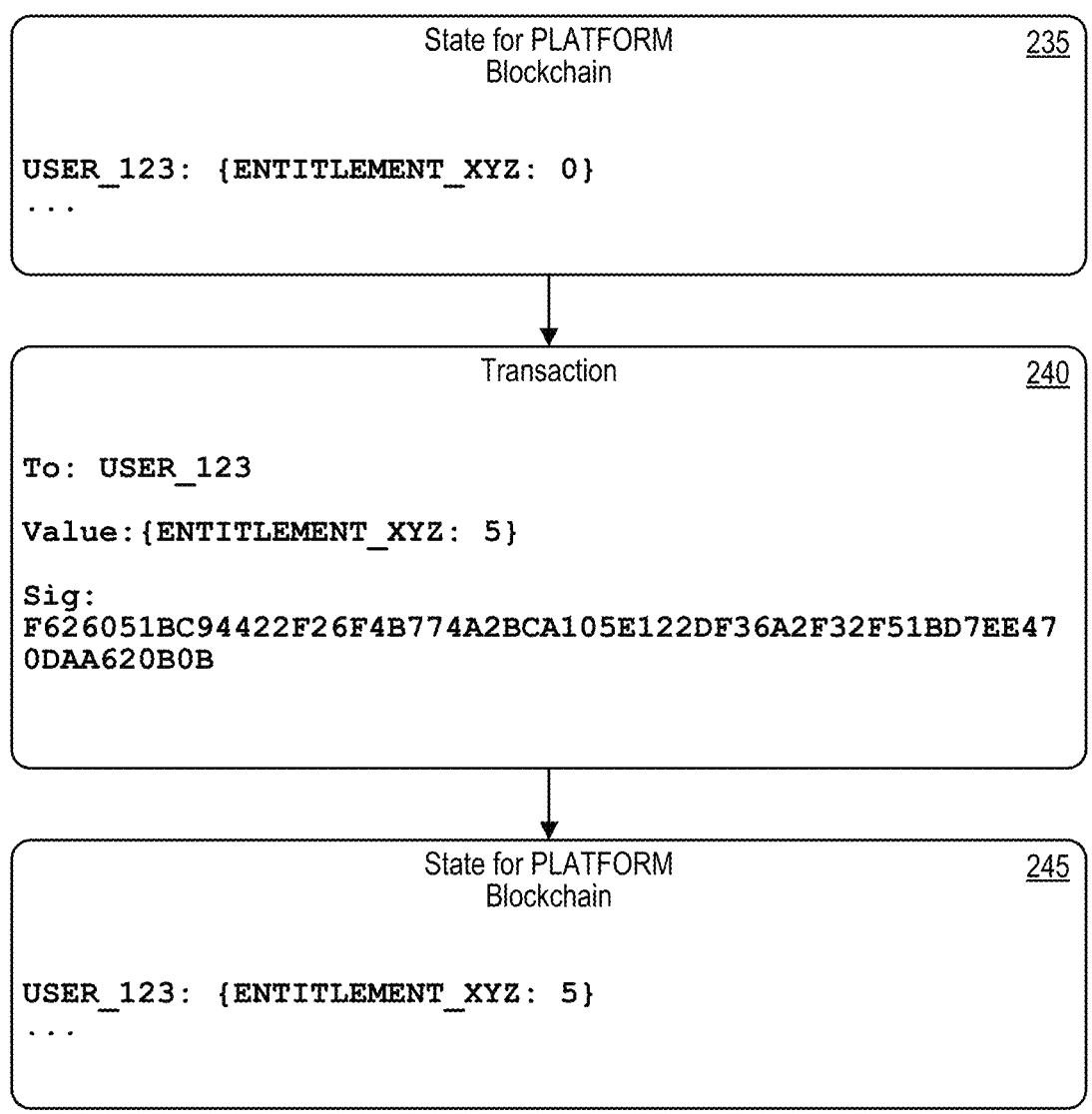
FIG. 2C illustrates a blockchain transaction that conveys transfer of an entitlement from a platform server to a player account.
Figure 2D:
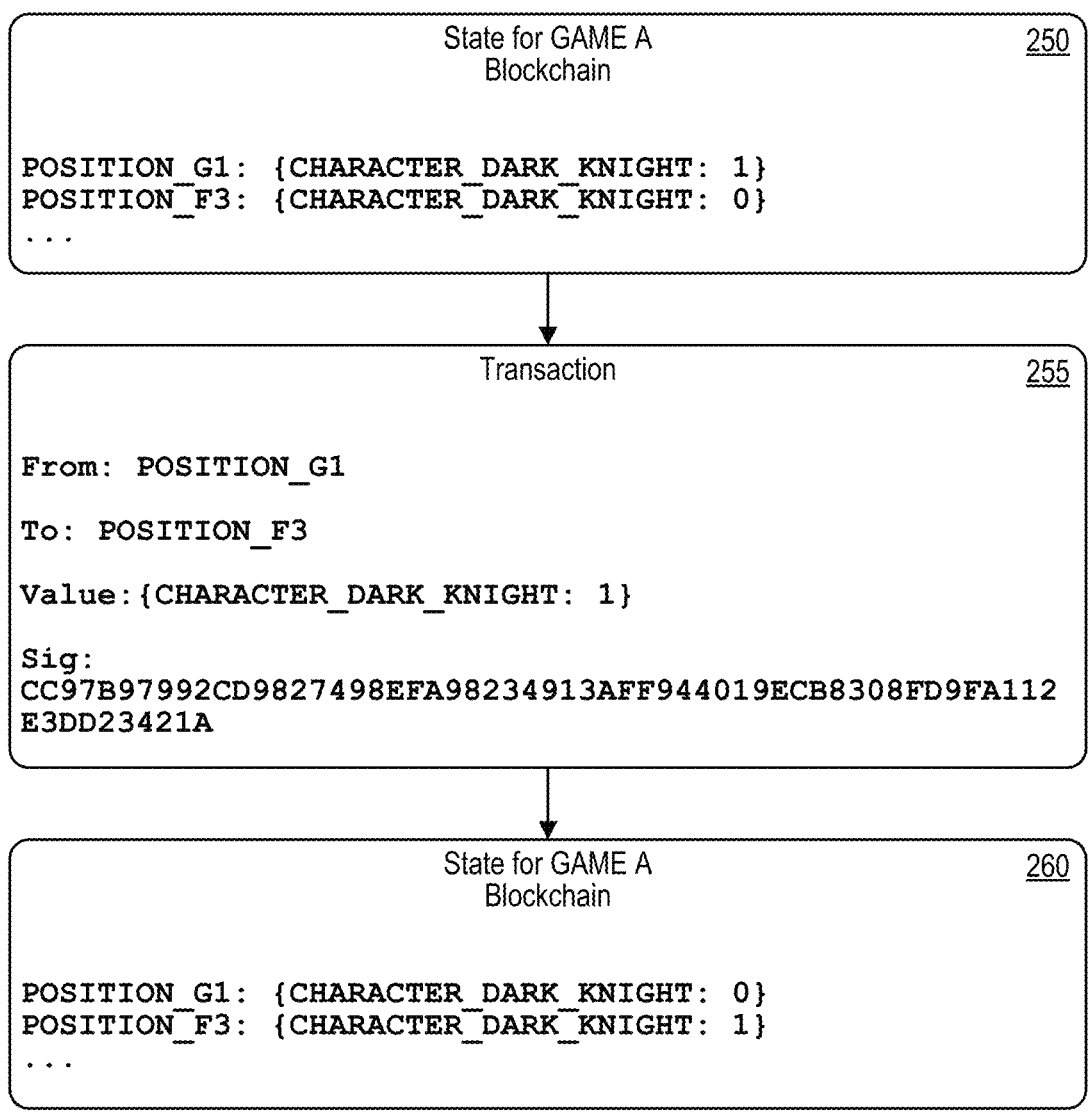
FIG. 2D illustrates a blockchain transaction that conveys an in-game movement of an in-game asset from a first position in an in-game environment to a second position in the in-game environment.
Figure 2E:
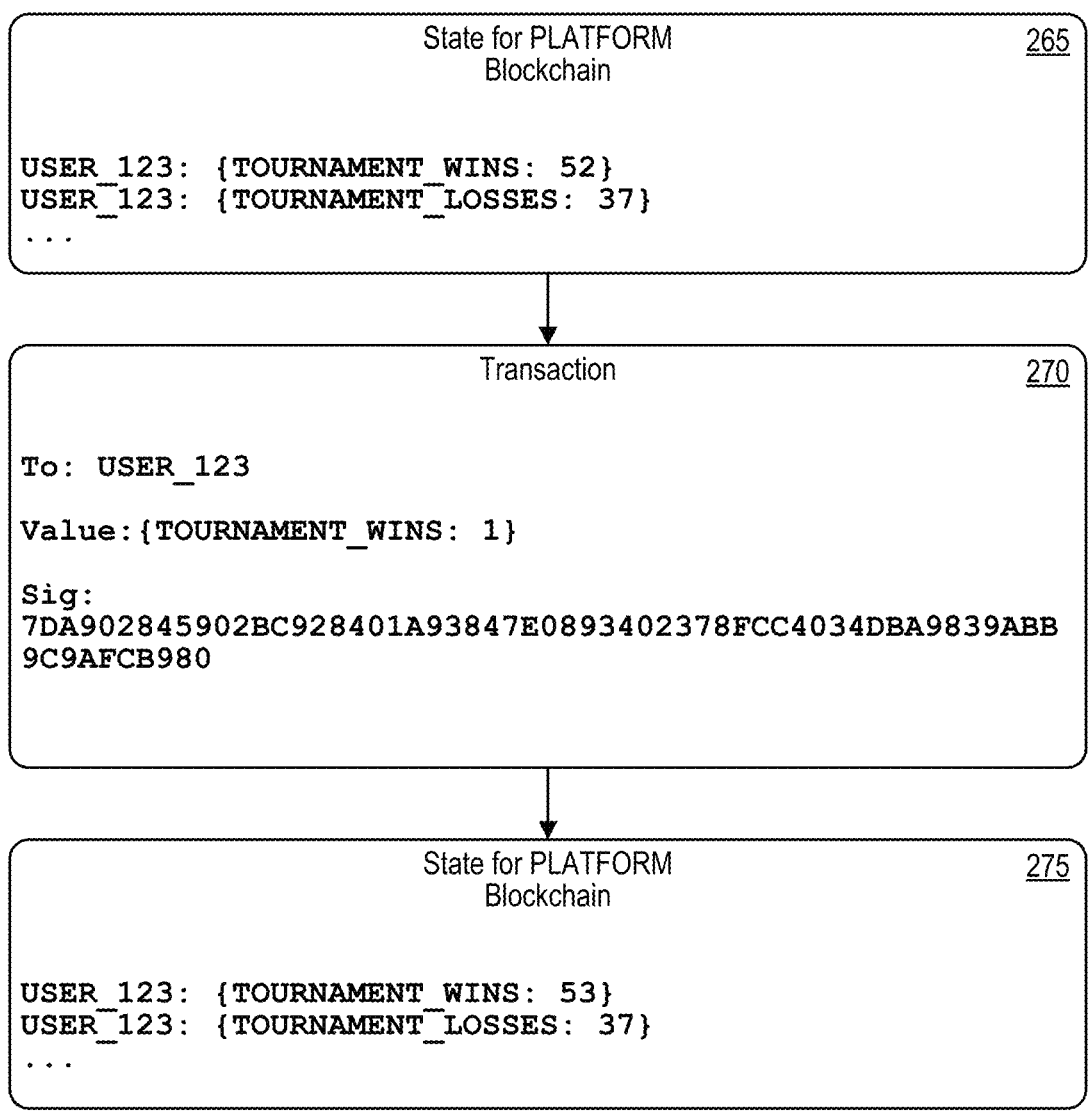
FIG. 2E illustrates a blockchain transaction that conveys a win/loss history for a player in a tournament.

For instance, FIG. 2E keeps track of tournament wins and losses associated with a specific player, which may be incremented as needed based on the player's performance in one or more tournaments. Incrementing a win or loss count may be performed as a transfer of a "win" or "loss" from a server 140/150 having an unlimited number of "wins" and "losses" to a specific player based on the player's performance. As another example, FIG. 2F keeps track of a player's health and number of coins in a very similar way. Actions occurring within the game that cause the player's health or coins to decrease may cause the player's account to transfer a specific amount of health or coins away from the player's account to a server 140/150. Actions occurring within the game that cause the player's health or coins to increase may cause the server 140 to transfer a specific amount of health or coins to the player's account.

Figure 7:
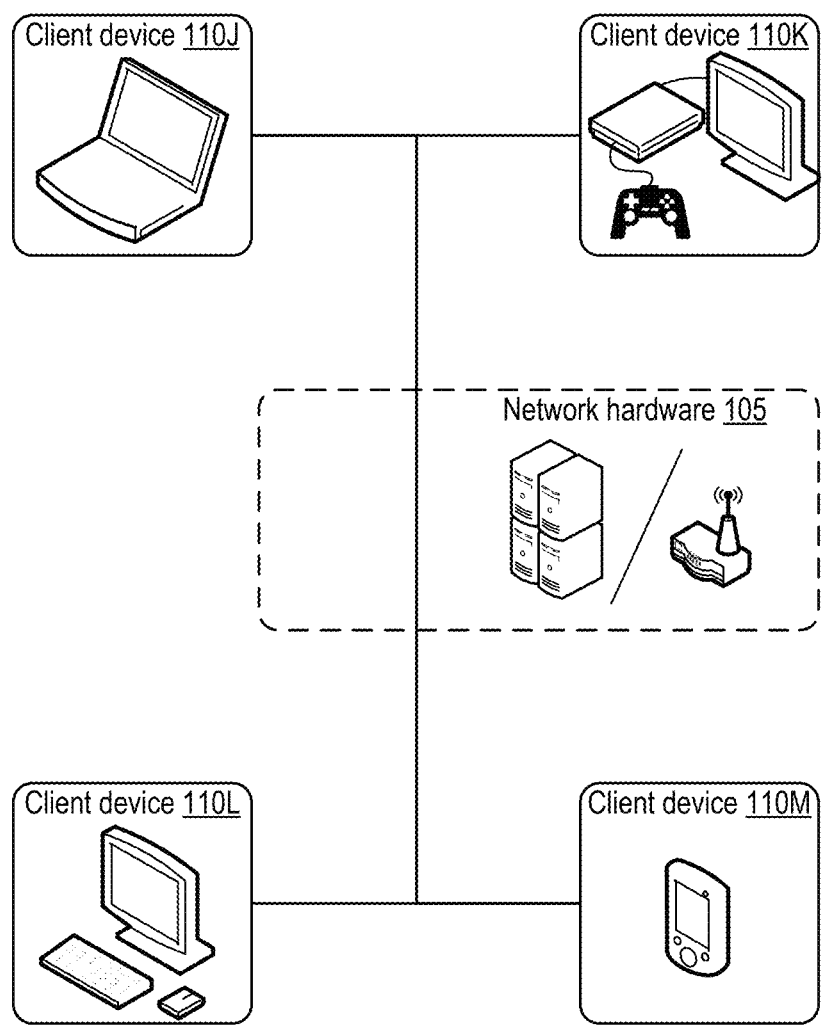
FIG. 7 illustrates a network environment through which different types of client devices participate in in-game transfers via the distributed blockchain ledger.

While additional network hardware 105 is not depicted in FIG. 1C, it should be understood that any communication or API call illustrated in or discussed with respect to FIG. 1C or any other figure herein may be routed or passed through additional network hardware 105 as discussed with respect to FIG. 1A, FIG. 1B, and/or FIG. 7.

Figure 8:
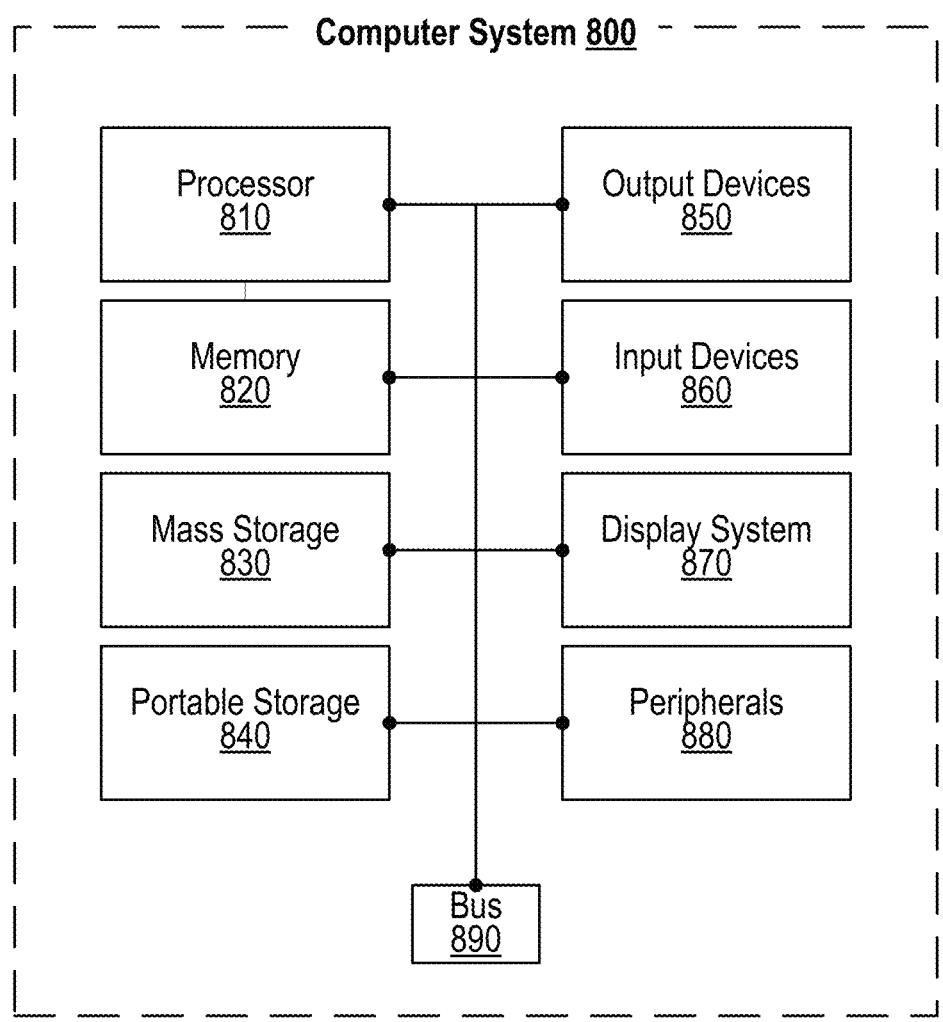
FIG. 8 is a block diagram of an exemplary computing device that may be used to implement some aspects of the subject technology.

Each client device 110, platform management server 150, entitlement server 140, or element of network hardware 105 illustrated in FIG. 1A, FIG. 1B, FIG. 1C, FIG. 7, or any other figure herein may include one or more computing devices 800 as illustrated in or discussed with respect to FIG. 8, or may include at least a subset of the components of one or more computing devices 800.

The term "user account" or "account" as used herein may refer to a user as visible by a specific blockchain ledger, that is, an entity associated with a particular private/public key pair of a public key infrastructure (PKI). The key pair may be used for transaction verification as discussed further with respect to FIG. 4. Each user account's private key may be stored on a client device 110 associated with the user account. Each user account's private key may alternately be stored on platform management server(s) 150, which may be less secure/decentralized than keeping it on client device 110 but may be easier to use for players and provide a lower barrier of entry to players not familiar with PKI encryption and certificates. Public keys and their corresponding user account identities may be stored at verified via certificate authority (CA). In some cases, the platform management server(s) 150 may be a certificate authority (CA).

FIG. 2A illustrates a blockchain transaction that conveys transfer of an in-game asset from one player account to another player account.

A first state 205 of the blockchain ledger of FIG. 2A before the transaction 210 of FIG. 2A states that a USER_123 possesses one of an in-game virtual asset ITEM_ABC, while a USER_456 possesses zero of the in-game virtual asset ITEM_ABC.

The transaction 210 of FIG. 2A states that one of the in-game virtual asset ITEM_ABC is to be transferred from the USER_123 to the USER_456.

A second state 215 of the blockchain ledger of FIG. 2A after the transaction 210 of FIG. 2A states that the USER_123 now possesses zero of the in-game virtual asset ITEM_ABC, while the USER_456 now possesses one of the in-game virtual asset ITEM_ABC.

While the blockchain ledger used for the transaction of FIG. 2A is stated to be a game-specific blockchain ledger 125 in FIG. 2A for a GAME A, such a transaction may alternately use a platform-specific blockchain ledger 115.

FIG. 2B illustrates a blockchain transaction that conveys transfer of an amount of in-game currency from one player account to another player account.

A first state 220 of the blockchain ledger of FIG. 2B before the transaction 225 of FIG. 2B states that a USER_123 possesses 50,000 of an in-game virtual currency GOLD, while a USER_456 possesses 200 of the in-game virtual currency GOLD.

The transaction 225 of FIG. 2B states that 1,000 of the in-game virtual currency GOLD is to be transferred from the USER_123 to the USER_456.

A second state 230 of the blockchain ledger of FIG. 2B after the transaction 225 of FIG. 2B states that the USER_123 now possesses 49,000 of the in-game virtual currency GOLD, while the USER_456 now possesses 1,200 of the in-game virtual currency GOLD.

Some technical benefits of tracking in-game virtual asset/currency transactions via blockchain-based technologies rather than via a centralized server is that virtual asset/currency transactions are more secure due to identity/transaction verification and the self-referential nature of each block's header within the blockchain structure itself, that all records are kept reliably up with no concern about downtime or single points of failure, that blockchain ledgers can be customized and personalized based on video game and/or video game platform and/or region, that the distributed architecture minimizes impact on network resources such as bandwidth and system resources such as processing power and memory due to load distribution. These benefits of decentralization can be combined with servers 140/150 illustrated in FIG. 1C to also bring some benefits of centralized servers, such as increased degree of control and management, into the decentralized environment and have technical benefits of both network architectures.

While the blockchain ledger used for the transaction of FIG. 2B is stated to be a game-specific blockchain ledger 125 in FIG. 2B for a GAME A, such a transaction may alternately use a platform-specific blockchain ledger 115.

FIG. 2C illustrates a blockchain transaction that conveys transfer of an entitlement from a platform server to a player account.

A first state 235 of the blockchain ledger of FIG. 2C before the transaction 240 of FIG. 2C states that a USER_123 possesses zero of a virtual entitlement asset ENTITLEMENT_XYZ. In an alternate variant of this first state 235, a "from" user account may be identified, such as "GAME_PUBLISHER: {ENTITLEMENT_XYZ: 500}" or "GAME_PUBLISHER: {ENTITLEMENT_XYZ: infinite}."

The transaction 240 of FIG. 2C states that five of the virtual entitlement asset ENTITLEMENT_XYZ is to be transferred to the USER_123. No "from" user account is identified, either implying that this quantity is to be generated, or it is to be transferred from a server 140/150 or a user account associated with the server 140/150. In an alternate variant of this transaction 240 corresponding to the alternate variant of first state 235 discussed above, a "from" user account may be identified, such as "GAME_PUBLISHER."

A second state 245 of the blockchain ledger of FIG. 2C after the transaction 240 of FIG. 2C states that the USER_123 now possesses five of the virtual entitlement asset ENTITLEMENT_XYZ. In an alternate variant of this second state 245 corresponding to the alternate variants of first state 235 and transaction 240 discussed above, a "from" user account may be identified, such as "GAME_PUBLISHER: {ENTITLEMENT_XYZ: 495}" or "GAME_PUBLISHER: {ENTITLEMENT_XYZ: infinite}."

Some benefits of tracking virtual entitlement transactions via blockchain-based technologies rather than via a centralized server is that game movements are now secure, recorded and accessible reliably, and decentralized.

While the blockchain ledger used for the transaction of FIG. 2C is stated to be a platform-specific blockchain ledger 115 in FIG. 2C, such a transaction may alternately use a game-specific blockchain ledger 125.

FIG. 2D illustrates a blockchain transaction that conveys an in-game movement of an in-game asset from a first position in an in-game environment to a second position in the in-game environment.

The in-game environment of FIG. 2D may be, for example, a chessboard, with dark and light pieces. The transaction discussed with respect to FIG. 2D represents a movement of the dark side's knight piece from one position to another. In this transaction, the two accounts/key pairs actually represent different positions on a chessboard (or other in-game virtual environment) rather than different players.

A first state 250 of the blockchain ledger of FIG. 2D before the transaction 255 of FIG. 2D states that a POSITION_G1 possesses one of an in-game virtual asset CHARACTER_DARK_KNIGHT, while a POSITION_F3 possesses zero of the in-game virtual asset CHARACTER_DARK_KNIGHT.

The transaction 255 of FIG. 2D states that one of the in-game virtual asset CHARACTER_DARK_KNIGHT is to be transferred from the POSITION_G1 to the POSITION_F3.

Some benefits of tracking character movements via blockchain-based technologies rather than via a centralized server is that game movements are now secure, recorded and accessible reliably, and decentralized.

A second state 260 of the blockchain ledger of FIG. 2D after the transaction 255 of FIG. 2D states that the POSITION_G1 now possesses zero of the in-game virtual asset CHARACTER_DARK_KNIGHT, while the POSITION_F3 now possesses one of the in-game virtual asset CHARACTER_DARK_KNIGHT.

While the blockchain ledger used for the transaction of FIG. 2D is stated to be a game-specific blockchain ledger 125 in FIG. 2D for a GAME A, such a transaction may alternately use a platform-specific blockchain ledger 115.

FIG. 2E illustrates a blockchain transaction that conveys a win/loss history for a player in a tournament.

As discussed with respect to FIG. 1C, FIG. 2E keeps track of tournament wins and losses associated with a specific player, which may be incremented as needed based on the player's performance in one or more tournaments. Incrementing a win or loss count may be performed as a transfer of a "win" or "loss" from a server 140/150 having an unlimited number of "wins" and "losses" to a specific player based on the player's performance.

In the transaction of FIG. 2E specifically, a first state 265 of the blockchain ledger of FIG. 2E before the transaction 270 of FIG. 2E states that a USER_123 possesses 52 of a virtual asset TOURNAMENT_WINS and 37 of a virtual asset TOURNAMENT_LOSSES.

The transaction 270 of FIG. 2E states that one of the virtual asset TOURNAMENT_WINS is to be transferred to the USER_123. No "from" user account is identified, either implying that this quantity is to be generated, or it is to be transferred from a server 140/150 or a user account associated with the server 140/150 as discussed further below.

A second state 275 of the blockchain ledger of FIG. 2E after the transaction 270 of FIG. 2E states that the USER_123 now possesses 53 of the virtual asset TOURNAMENT_WINS and still 37 of the virtual asset TOURNAMENT_LOSSES.

Similarly to the alternate variants of the first state 235, transaction 240, and second state 245 of FIG. 2C discussed above, the first state 265, transaction 270, and second state 275 of FIG. 2E may list a "from" virtual entity such as "GAME_PLATFORM" associated with the game, "TOURNAMENT_TRACKER" associated with the platform, or "GAME_LEAGUE" associated with a gaming league such as Major League Gaming. The same applies to FIG. 2C.

While the blockchain ledger used for the transaction of FIG. 2E is stated to be a platform-specific blockchain ledger 115 in FIG. 2E, such a transaction may alternately use a game-specific blockchain ledger 125.

Figure 2F:
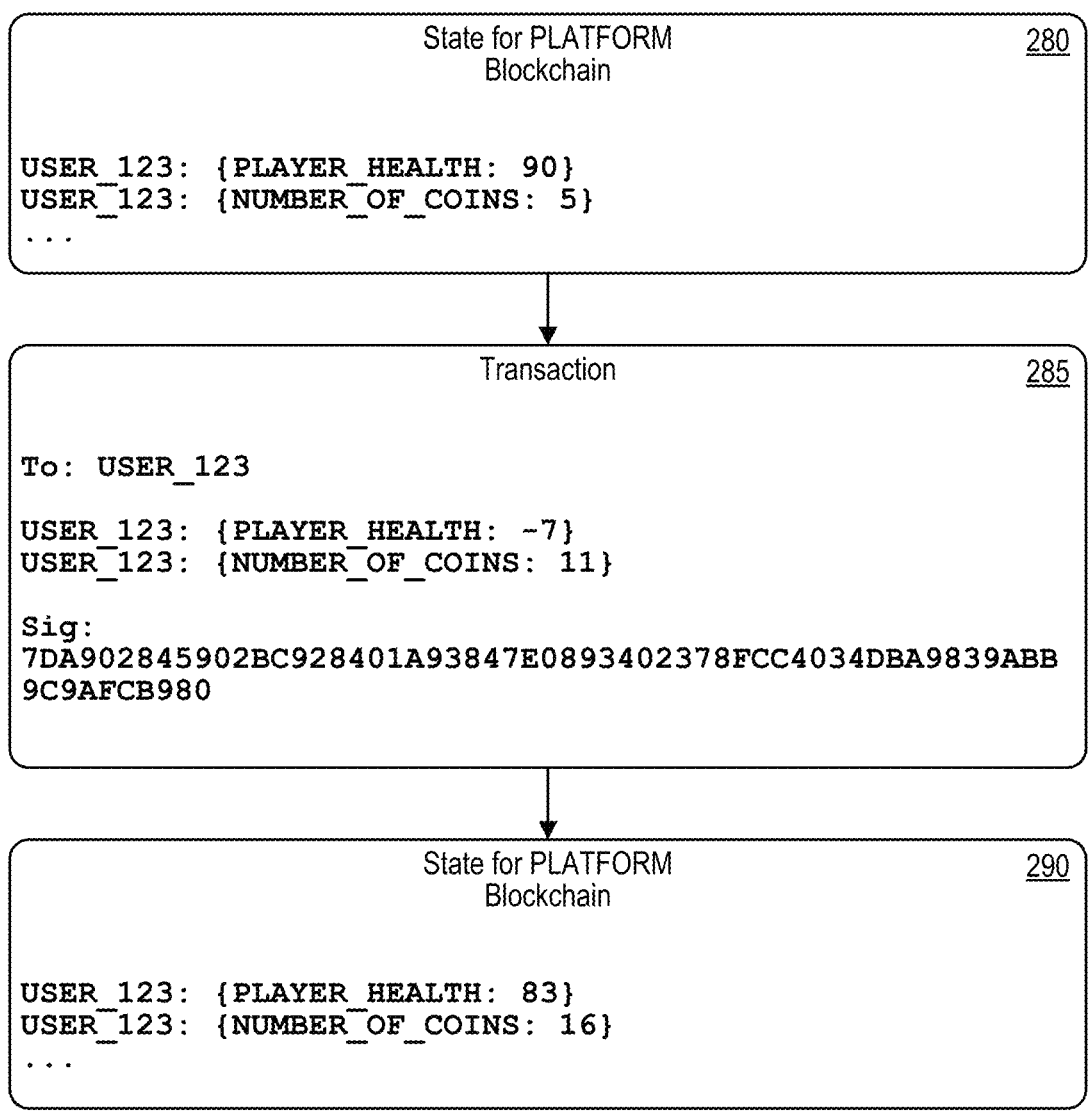
FIG. 2F illustrates a blockchain transaction that conveys in-game values specific to a particular player, such as health or number of coins.

FIG. 2F illustrates a blockchain transaction that conveys in-game values specific to a particular player, such as health or number of coins.

As discussed with respect to FIG. 1C, FIG. 2F keeps track of a player's health and number of coins in a very similar way. Actions occurring within the game that cause the player's health or coins to decrease may cause the player's account to transfer a specific amount of health or coins away from the player's account to a server 140/150. Actions occurring within the game that cause the player's health or coins to increase may cause the server 140 to transfer a specific amount of health or coins to the player's account.

In the transaction of FIG. 2F specifically, a first state 280 of the blockchain ledger of FIG. 2F before the transaction 285 of FIG. 2F states that a USER_123 possesses 90 of a virtual asset PLAYER_HEALTH and 5 of a virtual asset NUMBER_OF_COINS.

The transaction 285 of FIG. 2F states that 11 of the virtual asset NUMBER_OF_COINS is to be transferred to the USER_123 and that 7 of the virtual asset PLAYER_HEALTH is to be taken away from the USER_123. No second party in the transaction 285 is identified, either implying that these quantities are to be tweaked without transfer to or from another virtual entity, or that quantities are to be transferred between USER_123 and a server 140/150 (or a user account associated with the server 140/150) as discussed further below.

A second state 290 of the blockchain ledger of FIG. 2F after the transaction 285 of FIG. 2F states that the USER_123 now possesses 83 of the virtual asset PLAYER_HEALTH and 16 of the virtual asset NUMBER_OF_COINS.

Similarly to the alternate variants of the first state 235, transaction 240, and second state 245 of FIG. 2C discussed above, the first state 280, transaction 285, and second state 290 of FIG. 2F may list a "from" virtual entity such as "GAME_PLATFORM" associated with the game, "PLATFORM_TRACKER" associated with the platform, or "GAME_LEAGUE" associated with a gaming league such as Major League Gaming. The player may alternately be in the "from" field while the virtual entity is in the "to" field, especially where the player is losing a virtual asset as in PLAYER_HEALTH in the transaction 285 of FIG. 2F.

While the blockchain ledger used for the transaction of FIG. 2F is stated to be a platform-specific blockchain ledger 115 in FIG. 2F, such a transaction may alternately use a game-specific blockchain ledger 125.

The transactions 210, 225, 240, 255, 270, and 285 of FIGS. 2A-2F are illustrated including "sig" or "signature" values, which are hash values generated before, during, or after the transaction goes through. The hash may be a hash of the transaction or a Merkle root 546 of a few transactions within the same block as illustrated in and discussed with respect to FIG. 5.

FIG. 3 illustrates a portion of a blockchain ledger that implements distributed in-game transfer functionality.

Three blocks—Block A 305, Block B 335, and Block C 365—of the blockchain ledger 300 are illustrated in FIG. 3.

Each block includes a block header 310/340/370 and a list of one or more transactions 330/360/390. The block header 310 includes a hash of the block header of the previous block 315/345/375, which may alternately be replaced or supplemented by a hash of the entire previous block. For instance, the header 370 of block C 365 includes a hash 375 of the header 340 of block B 335. The header 340 of block B 335 likewise includes a hash 345 of the header 310 of block A 305. The header 310 of block A 305 likewise includes a hash 315 of a header (not pictured) of previous block (not pictured) that is before block A 305 in the blockchain 300. Including the hash of the previous block's header secures the blockchain ledger 300 by preventing modification of any block of the blockchain 300 after the block has been entered into the blockchain 300, as any change to a particular block would cause that block header's hash in the next block to be incorrect. Further, modification of that block header's hash in the next block would make the next block's header's hash in the block after the next block incorrect, and so forth.

Each block's block header 310/340/370 also includes a Merkle root 320/350/380, which is generated based on hashes of the transaction(s) listed in the list of transaction(s) 330/360/390 for that block as explained further with respect to FIG. 5. Any attempt to modify a transaction after the block has been entered would change the Merkle root 320/350/380, which would change the hash 315/345/375 of the block header 310/340/370, again allowing all nodes to see if any block has been tampered with.

Each block's block header 310/340/370 may also include various elements of metadata, such as a version number for the blockchain ledger platform, a version number for the block itself that identifies how many nonces have been tried, a timestamp for verification of each transaction, a timestamp for generation of the block, a difficulty target value as discussed with respect to FIG. 4, a nonce value as discussed with respect to FIG. 4, or a combination thereof.

Each block 305/335/365 of the blockchain 300 also includes a list of one or more transaction(s) 330/360/390. Each of these transactions may be identified in a similar matter to the transactions 210, 225, 240, 255, 270, and 285 of FIGS. 2A-2F.

While FIG. 3 only illustrates three blocks 305/335/365 of the blockchain 300, it should be understood that any blockchain discussed herein may be longer or shorter in that it may have more or fewer than three blocks.

FIG. 4 is a flow diagram illustrating operations for realizing an in-game transfer transaction and adding the transaction to the blockchain ledger.

At step 405, a device A associated with a user account A receives user input(s) conveying an intended transaction of an identified quantity of a virtual asset from a transferor account to a transferee account. In most cases, user account A must be the transferor account for the intended transaction to proceed, but in some cases it may alternately be the transferee account. In some cases, user account A may even be a third party account other than the transferor and transferee, such as an account corresponding to a game developer, publisher, platform, adjudicative entity for transactions, or other entity with heightened power over transactions.

At step 410, Device A associated with user account A encrypts at least part of the intended transaction using a private key associated with user account A to digitally sign the intended transaction.

At step 415, Device A broadcasts or otherwise transmits the encrypted intended transaction to each device (node) of a distributed peer-to-peer network of devices (nodes), optionally along with a public key corresponding to the private key used to digitally sign the transaction in step 410. Nodes receiving the public key may verify it against a key stored via a CA, or may verify a hash of the public key against a hash of a public key stored via the CA. Alternately, nodes may simply acquire the public key from the CA. The nodes may thereby verify that the intended transaction broadcast at step 415 was indeed digitally signed at step 410 by the user account A with the private key corresponding to user account A.

At step 420, a "Miner" Device B, a node in the distributed peer-to-peer network, validates the intended transaction in one or more of three ways.

The "Miner" Device B may decrypt the intended transaction using the public key to verify that it was indeed digitally signed at step 410 by the user account A with the private key corresponding to user account A, and may optionally verify that user account A is a the transferor account, transferee account, or another account authorized to request the transaction in question.

The "Miner" Device B may identify, based on existing records in the blockchain, that the transferor account possesses at least the identified quantity of the asset to be transferred.

The "Miner" Device B may identify that the transferor acct is not trying to perform a simultaneous conflicting transfer, such as one that would leave the transferor acct lacking the identified quantity of the virtual asset to be transferred. That is, the "Miner" Device B may check that if all intended transactions involving the transferor account were to complete, the transferor account would be left with a non-negative (greater than or equal to zero) quantity of the virtual asset.

At step 425, once the intended transaction (and optionally other transactions in same time predetermined period) is validated as in step 420, the "Miner" Device B generates a block recording the verified transaction (and optionally other verified transactions in same predetermined time period), and broadcasts the block to the distributed peer-to-peer network of devices (nodes), thereby allowing each device (node) to update its copy of the blockchain ledger by appending the new block.

At step 430, each device (node) of the distributed peer-to-peer network updates its copy of the blockchain ledger upon receipt of the new block from "Miner" Device B by appending the new block. The transaction is now complete.

Consensus among the nodes of the distributed network regarding new blocks can be achieved using a practical byzantine fault tolerance (PBFT) algorithm, a proof-of-work (PoW) algorithm, a proof-of-stake (PoS) algorithm, a delegated proof-of-stake (DPoS) algorithm, a proof-of-activity (PoA) algorithm, a proof-of-burn (PoB) algorithm, a proof-of-capacity (PoC) algorithm, a proof-of-storage (PoSt) algorithm, a proof-of-space (PoSp) algorithm, a proof-of-elapsed-time (PoET) algorithm, or a combination thereof.

Optional steps 440, 445, and 450 expand on steps 420, 425, and 435.

At step 440, the "Miner" Device B is rewarded for generating the new block, for example with a cryptocurrency. The cryptocurrency may have real value and be exchangeable for real fiat currency, may be used as a virtual in-game currency, or both. The generation and transfer of cryptocurrency to reward "Miner" Device B may be identified as a transaction in the next block after the block generated by "Miner" Device B at step 425. Similarly, the block generated by "Miner" Device B at step 425 may identify a "Miner" Device that generated a previous block in the blockchain and may generate and transfer a similar reward to that "Miner" Device.

Step 445 explains that generating a new block to add to the blockchain can be made to be intentionally difficult if "miner" devices/nodes are to be rewarded as in step 440. A predetermined numeric (decimal or hexadecimal) difficulty target value may be used. To successfully generate a new block, a hash of the block (or block header) should be numerically less than the difficulty target value for the new block to be successful. Each "miner" device/node can try hashing the new block with various different nonce values in the metadata 325/355/385 of the block header in an attempt to find a nonce value that makes the hash of the whole block (or block header) be numerically less than the difficulty target value.

Step 450 explains that the difficulty target value can stay constant during a predetermined time period, such as 2 weeks. Just before the predetermined time period ends and before the next time period starts, difficulty target value is potentially adjusted up or down slightly, using the formula identified in block 455 or a similar formula. In some cases, a predetermined upper and lower bound may be set on how much the difficulty target value may be adjusted by.

The formula identified in block 455 identifies that (new adjusted difficulty target value)=(previous difficulty target value)×((predetermined time period)/(total transaction time for N transactions during predetermined time period)). N is defined as ((predetermined time period)/(desired block generation time)).

If the time period is 2 weeks (20160 minutes) and each block should take approximately 10 minutes to generate, N is ((20160 minutes)/(10 minutes))=2016. Thus, one might calculate the new adjusted difficulty target value as (new adjusted difficulty target value)=(previous difficulty target value)×((20160 minutes)/(total transaction time for 2016 transactions during predetermined time period)).

FIG. 5 is a diagram of a Merkle tree for securing an in-game transfer transaction using the blockchain ledger.

The Merkle tree of FIG. 5 is used to generate a Merkle root 546 for a block with 8 transactions: transaction A 502, transaction B 504, transaction C 506, transaction D 508, transaction E 510, transaction F 512, transaction G 514, and transaction H 516.

A hash is generated for each transaction. Transaction A 502 is hashed into hash A 518, transaction B 504 is hashed into hash B 520, transaction C 506 is hashed into hash C 522, transaction D 508 is hashed into hash D 524, transaction E 510 is hashed into hash E 526, transaction F 512 is hashed into hash F 528, transaction G 514 is hashed into hash G 530, and transaction H 516 is hashed into hash H 532.

Each of the hashes A 518 through H 532 are hashed after being paired with another hash. That is, Hash A 518 and Hash B 520 are hashed together into Hash AB 534, Hash C 522 and Hash D 524 are hashed together into Hash CD 536, Hash E 526 and Hash F 528 are hashed together into Hash EF 538, and Hash G 530 and Hash H 532 are hashed together into Hash GH 540.

This process repeats until a single hash results. That is, Hash AB 534 and Hash CD 536 are hashed together into Hash ABCD 542, and Hash EF 538 and Hash GH 540 are hashed together into Hash EFGH 544. Hash ABCD 542 and Hash EFGH 544 are hashed together into Hash ABCDEFGH 546. Hash ABCDEFGH 546 is also known as the Merkle root 546 for the 8 transactions: transaction A 502, transaction B 504, transaction C 506, transaction D 508, transaction E 510, transaction F 512, transaction G 514, and transaction H 516. Any modification to any of these 8 transactions also necessarily changes the Merkle root 546, which can be verified by any node to ensure that no changes were made to the transactions in any given block.

Figure 6:
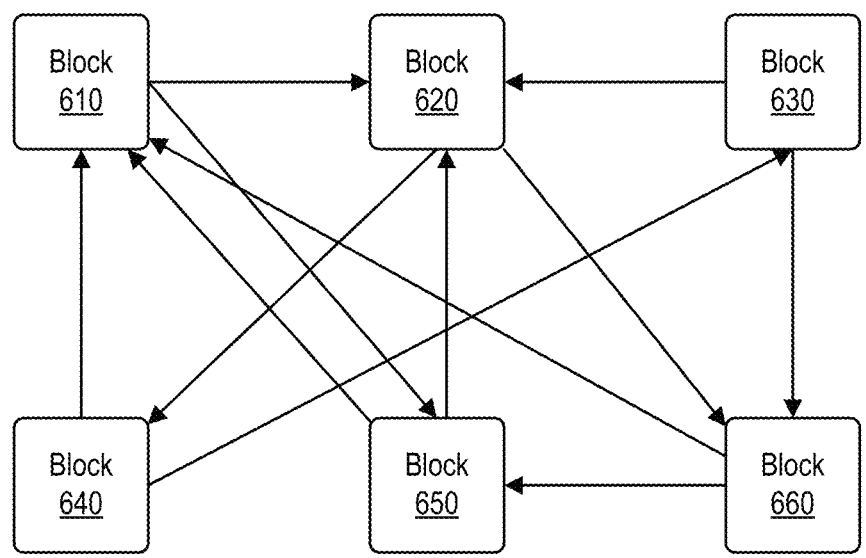
FIG. 6 illustrates a distributed directed acyclic graph (DAG) ledger.

FIG. 6 illustrates a distributed directed acyclic graph (DAG) ledger.

While FIG. 3 and FIG. 4 discuss use of a blockchain ledger, it should be understood that a non-linear ledger structure, such as the directed acyclic graph (DAG) ledger structure of FIG. 6, may be used instead of a blockchain ledger discussed herein. In a DAG ledger, each block header includes the hashes of block headers of a predetermined number of other "parent" blocks in the DAG ledger selected either at random or in some other non-linear manner, rather than the hash of a single previous block in the blockchain. Each block header may alternately or additionally include hashes of the entire parent blocks instead of hashes of just the headers of the parent blocks. Where each block header includes multiple hashes corresponding to different parent blocks or their headers, these hashes can be combined together into a Merkle root much like the hashes A 518, B 520, C 522, D 524, E 526, F 528, G 530, and H 532 of FIG. 5.

For example, in the DAG ledger of FIG. 6, the predetermined number is two, at least after the first two blocks are generated. In the web DAG ledger of FIG. 6, the parent blocks are indicated using arrows. Block 610 includes hashes of the block headers of parent blocks 620 and 650. Block 620 includes hashes of the block headers of parent blocks 640 and 660. Block 630 includes hashes of the block headers of parent blocks 620 and 660. Block 640 includes hashes of the block headers of parent blocks 610 and 630. Block 650 includes hashes of the block headers of parent blocks 610 and 620. Block 660 includes hashes of the block headers of parent blocks 610 and 650. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some cases, the number of parent blocks in a DAG ledger is not strictly predetermined, but there is a predetermined minimum number of blocks, such as a two-parent minimum or a one-parent minimum, meaning that each block has at least the predetermined minimum number of parent blocks. In some cases, each block in a DAG ledger may only identify only a single transaction rather than multiple transactions, and may therefore forego a Merkle root and/or replace it with a hash of the single transaction. In other implementations, each block may identify multiple transactions associated with a predetermined time period as discussed herein.

FIG. 7 illustrates a network environment through which different types of client devices participate in in-game transfers via the distributed blockchain ledger.

While FIG. 1A, FIG. 1B, and FIG. 1C illustrate client devices 110A-110F as each being the same particular type of video game console, they need not be identical. There may be minor differences between the different client devices 110, such as firmware, firmware version, operating system, operating system version, hardware, hardware version, or combinations thereof. For example, different client devices might include hard drives or flash memory chips with subtly or widely different storage capabilities. Later-produced client devices 110 might include faster processor(s) or additional cores. Certain client devices 110 might include additional hardware that might be missing from other client devices 110, even if they are Furthermore, while FIG. 1A, FIG. 1B, and FIG. 1C illustrate client devices 110A-110F as each being the same particular type of video game console, this need not be the case at all. Four client devices 110 are illustrated in FIG. 7, including a client device 110J that is a laptop computer, a client device 110K that is a home video game console, a client device 110L that is a desktop computer, and a client device 110M that is a portable device/mobile device such as a smartphone, a tablet computing device, a media player device, a portable video game console, a wearable device, or a combination thereof. The client devices 110 of FIG. 7 can communicate directly or via network hardware 105 as discussed with respect to FIG. 1A, FIG. 1B, and FIG. 1C.

The client devices 110 of FIG. 7 can run game-specific blockchain ledgers 125 as in FIG. 1A. This is particularly useful if the game is released on multiple platforms (types of computing device) or is ported from one platform (type of computing device) to one or more other platforms (types of computing device). That said, client devices 110 need not be compatible with or capable of playing the video game to which the game-specific blockchain ledger 125 corresponds.

The client devices 110 of FIG. 7 can run platform-specific blockchain ledgers 115 as in FIG. 1B. This is particularly useful if the game is released on multiple platforms (types of computing device) or is ported from one platform (type of computing device) to one or more other platforms (types of computing device), thereby expanding the effective platform of the game to one encompassing multiple types of computing device. That said, client devices 110 need not be compatible with or capable of playing any video game(s) associated with the platform to which the platform-specific blockchain ledger 115 corresponds.

Use of a variety of client devices 110 may be useful to help ease the burden to video game consoles by allowing remote server(s) to take on some of the work of verifying transactions and generating blocks if needed. This can be particularly useful at launch of a new video game console, to make sure that transactions can be verified in a timely manner even for the first few new video game consoles to attempt transactions using the blockchain ledger.

FIG. 8 illustrates an exemplary computing system 800 that may be used to implement some aspects of the subject technology. For example, any of the computing devices, computing systems, network devices, network systems, servers, and/or arrangements of circuitry described herein may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 880, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 880 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 880. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, or any other components necessary for the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, or any other components necessary for the communication types listed above, such as cellular SIM cards.

Display system 880 may include a liquid crystal display (LCD), a plasma display, an organic light-emitting diode (OLED) display, an electronic ink or "e-paper" display, a projector-based display, a holographic display, or another suitable display device. Display system 880 receives textual and graphical information, and processes the information for output to the display device. The display system 880 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 800 of FIG. 8 are those typically found in computer systems that may be suitable for use with some aspects of the subject technology and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 800 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay®/Mastercard®/Visa® (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for management of in-game virtual asset transfers via a distributed architecture including a plurality of computing devices, the method comprising:
storing a blockchain ledger including a plurality of blocks, wherein each of the plurality of computing devices also stores a copy of the blockchain ledger;
receiving a message identifying an intended transfer of an identified quantity of an in-game virtual asset from a transferor account to a transferee account, the identified quantity of the in-game virtual asset acquired via gameplay of a video game using a device associated with the transferor account by a player associated with the transferor account and used within the video game using a device associated with the transferee account by a player associated with the transferee account upon completion of the intended transfer;

verifying that the device associated with the transferor account and the device associated with the transferee account are authorized to play the video game;
verifying that the intended transfer is valid at least by identifying, based on at least one of the plurality of blocks in the blockchain ledger, that the transferor account possesses at least the identified quantity of the in-game virtual asset;
generating a hash of a most recent block of the blockchain ledger;
generating a new block header for a new block, wherein the new block header comprises at least the hash of the most recent block of the blockchain ledger;
generating the new block in response to verifying that the device associated with the transferor account and the device associated with the transferee account are authorized to play the video game, wherein the new block comprises at least the intended transfer and the new block header;
appending the new block to the plurality of blocks of the blockchain ledger in response to verifying the intended transfer; and
transmitting the new block to the plurality of computing devices that each store the blockchain ledger in response to verifying the intended transfer, wherein each of the plurality of computing devices also appends the new block to their respective copy of the blockchain ledger, thereby completing the intended transfer and permitting the device associated with the transferee account to use the in-game virtual asset within the video game.

2. The method of claim 1, wherein the new block also comprises one or more additional intended transfers other than the intended transfer, wherein the intended transfer and the one or more additional intended transfers all occurred within a predetermined time period.

3. The method of claim 2, further comprising generating a Merkle root using the intended transfer and the one or more additional intended transfers, wherein the new block header also comprises the Merkle root.

4. The method of claim 2, further comprising:
receiving information identifying the one or more additional intended transfers other than the intended transfer; and
verifying that the one or more additional intended transfers other than the intended transfer are valid by verifying that each of a set of one or more additional in-game virtual asset quantities are possessed by each of a set of one or more additional transferor accounts.

5. The method of claim 2, further comprising verifying that none of the one or more additional intended transfers conflict with the intended transfer by identifying that the transferor account will retain a non-negative quantity of the in-game virtual asset after the intended transfer and the one or more additional intended transfers are completed.

6. The method of claim 1, wherein the new block further identifies issuance of a reward for a prior verifier account associated with generation of the most recent block of the blockchain ledger.

7. The method of claim 1, further comprising:
retrieving a public key corresponding to the transferor account;
decrypting an encrypted digital signature portion of the message using the public key corresponding to the transferor account;
verifying that the encrypted digital signature portion of the message was encrypted using a private key associated with the transferor account based on decryption of the encrypted digital signature portion of the message being successful; and
verifying that the message was generated via the transferor account based on verification that the encrypted digital signature portion of the message was encrypted using the private key associated with the transferor account.

8. The method of claim 1, wherein the new block header also comprises a nonce value.

9. The method of claim 8, further comprising:
generating a prior version of the new block before generating the new block, wherein the prior version of the new block includes a prior version of the new block header that comprises a prior nonce value other than the nonce value;
generating a hash of the prior version of the new block;
identifying that the hash of the prior version of the new block is greater than a predetermined numeric difficulty target value;
generating a hash of the new block after generating the new block; and
identifying that the hash of the new block is less than the predetermined numeric difficulty target value.

10. The method of claim 1, further comprising:
storing a first numeric difficulty target value that corresponds to a difficulty of mining during a first predetermined time period;
identifying that the first predetermined time period has ended;
calculating a mining efficiency ratio by dividing the first predetermined time period by a total mining time for a predetermined number of transfers occurring during the first predetermined time period;
calculating a second numeric difficulty target value by multiplying the first numeric difficulty target value by the mining efficiency ratio, wherein the second numeric difficulty target value corresponds to a difficulty of mining during a second predetermined time period; and
identifying that the first predetermined time period has begun.

11. The method of claim 1, wherein the in-game virtual asset is an in-game currency that the player associated with the transferee account uses within the video game by trading the in-game currency for one or more additional in-game assets other than the in-game currency within the video game.

12. The method of claim 1, wherein the in-game virtual asset is an in-game item that the player associated with the transferee account uses within the video game to modify gameplay of the video game.

13. The method of claim 1, wherein the blockchain ledger identifies a plurality of transfers associated only with the video game, wherein each of the plurality of transfers is a transfer of at least one of a set of one or more in-game virtual assets, the set of one or more in-game virtual assets including the in-game virtual asset.

14. The method of claim 1, wherein the blockchain ledger identifies a plurality of transfers associated with a set of one or more video games compatible with a particular type of video game console, wherein the set of one or more video games includes the video game, wherein each of the plurality of computing devices is the particular type of video game console, wherein each of the plurality of transfers is a transfer of at least one of a set of one or more in-game virtual assets, the set of one or more in-game virtual assets including the in-game virtual asset.

15. The method of claim 1, wherein the transferor account represents a first virtual location within a virtual environment of the video game, wherein the transferee account represents a second virtual location within the virtual environment of the video game, and wherein transfer of the identified quantity of the in-game virtual asset from the transferor account to the transferee account represents movement of the identified quantity of the in-game virtual asset from the first virtual location to the second virtual location within the virtual environment of the video game.

16. The method of claim 1, wherein verifying that the device associated with the transferor account and the device associated with the transferee account are authorized to play the video game includes verifying that the device associated with the transferor account and the device associated with the transferee account each store one or more game files associated with play of the video game.

17. A system for management of in-game virtual asset transfers via a distributed architecture including a plurality of computing devices, the system comprising:
- a non-transitory computer-readable storage medium that stores at least instructions and a blockchain ledger including a plurality of blocks, wherein each of the plurality of computing devices also stores a copy of the blockchain ledger;
- a network communication transceiver that receives a message identifying an intended transfer and that transmits a new block to the plurality of computing devices, the intended transfer corresponding to transfer of an identified quantity of an in-game virtual asset from a transferor account to a transferee account, the identified quantity of the in-game virtual asset acquired via gameplay of a video game using a device associated with the transferor account by a player associated with the transferor account and used within the video game using a device associated with the transferee account by a player associated with the transferee account upon completion of the intended transfer; and
- one or more processors executing the instructions, wherein execution of the instructions via the one or more processors causes the one or more processors to:
  - verify that the device associated with the transferor account and the device associated with the transferee account are authorized to play the video game,
  - verify that the intended transfer is valid at least by identifying, based on at least one of the plurality of blocks in the blockchain ledger, that the transferor account possesses at least the identified quantity of the in-game virtual asset,
  - generate a hash of a most recent block of the blockchain ledger,
  - generate a new block header for a new block, wherein the new block header comprises at least the hash of the most recent block of the blockchain ledger,
  - generate the new block in response to verifying that the device associated with the transferor account and the device associated with the transferee account are authorized to play the video game, wherein the new block comprises at least the intended transfer and the new block header, and
  - append the new block to the plurality of blocks of the blockchain ledger in response to verifying the intended transfer, wherein each of the plurality of computing devices also appends the new block to their respective copy of the blockchain ledger in response to transmission of the new block to the plurality of computing devices by the network communication transceiver, thereby completing the intended transfer and permitting the device associated with the transferee account to use the in-game virtual asset within the video game.

18. The system of claim 17, wherein the non-transitory computer-readable storage medium also stores the video game, and wherein each of the plurality of computing devices also stores the video game.

19. The system of claim 17, wherein the non-transitory computer-readable storage medium also stores a second video game other than the video game, and wherein each of the plurality of computing devices is a particular type of video game console that is compatible with at least the video game and the second video game.

20. A method for transferring in-game virtual assets that is managed via a distributed architecture including a plurality of computing devices, the method comprising:
- storing a blockchain ledger on a first computing device, the blockchain ledger including a plurality of blocks, wherein each of a plurality of computing devices other than the first computing device also stores a copy of the blockchain ledger;
- receiving an input via a user interface of a first computing device associated with a transferor account, the input identifying an intended transfer corresponding to transfer of an identified quantity of an in-game virtual asset from the transferor account to a transferee account, the identified quantity of the in-game virtual asset acquired via gameplay of a video game using a device associated with the transferor account by a player associated with the transferor account and used within the video game using a device associated with the transferee account by a player associated with the transferee account upon completion of the intended transfer;
- generating a message identifying the intended transfer;
- retrieving a private key associated with the transferor account;
- modifying the message by encrypting at least a portion of the message with the private key;
- transmitting the message from the first computing device to the plurality of computing devices other than the first computing device, wherein a second computing device of the plurality of computing devices verifies that the device associated with the transferor account and the device associated with the transferee account are authorized to play the video game and verifies that the intended transfer is valid by identifying, based on at least one of the plurality of blocks in the blockchain ledger, that the transferor account possesses at least the identified quantity of the in-game virtual asset;
- receiving a new block at the first computing device from the second computing device, the new block identifying the intended transfer; and
- appending the new block to the plurality of blocks of the blockchain ledger at the first computing device, thereby completing the intended transfer.

\* \* \* \* \*